United States Patent [19]

Kubo

[11] Patent Number: 4,674,050
[45] Date of Patent: Jun. 16, 1987

[54] ANTI-SKID BRAKE CONTROL SYSTEM FOR AUTOMOTIVE VEHICLE

[75] Inventor: Jun Kubo, Hino, Japan

[73] Assignee: Nissan Motor Company, Limited, Yokohama, Japan

[21] Appl. No.: 601,330

[22] Filed: Apr. 17, 1984

[30] Foreign Application Priority Data

Apr. 23, 1983 [JP] Japan .................. 58-70899

[51] Int. Cl.$^4$ ............................ B60T 8/34
[52] U.S. Cl. .................. 364/426; 303/97; 303/105
[58] Field of Search ............ 364/426, 565, 566; 303/95, 97, 105–109; 180/179; 361/238

[56] References Cited

U.S. PATENT DOCUMENTS

| | | | |
|---|---|---|---|
| 2,914,359 | 11/1959 | Yarber | 303/24 B |
| 3,398,995 | 8/1968 | Martin | 303/105 |
| 3,503,653 | 3/1970 | Davis et al. | 303/95 |
| 3,637,264 | 1/1972 | Leiber et al. | 303/105 |
| 3,752,536 | 8/1973 | Machek | 303/115 |
| 3,930,688 | 1/1976 | Rau et al. | 364/426 |
| 3,938,612 | 2/1976 | Boudeville et al. | 364/426 |
| 3,943,345 | 3/1976 | Ando et al. | 364/566 |
| 3,985,396 | 10/1976 | Kuwana et al. | 364/426 |
| 4,267,575 | 5/1981 | Bounds | 364/565 |
| 4,315,213 | 2/1982 | Wolff | 364/565 |
| 4,398,260 | 8/1983 | Takahashi et al. | 364/565 |
| 4,408,290 | 10/1983 | Kubo et al. | 364/566 |
| 4,517,647 | 5/1985 | Harada et al. | 303/95 |
| 4,546,437 | 10/1985 | Bleckmann et al. | 364/426 |
| 4,552,413 | 11/1985 | Fujii et al. | 364/426 |
| 4,569,560 | 2/1986 | Kubo | 303/92 |

Primary Examiner—Gary Chin
Attorney, Agent, or Firm—Schwartz, Jeffery, Schwaab, Mack, Blumenthal & Evans

[57] ABSTRACT

An anti-skid brake control system performs arithmetic operations for deriving wheel speed on the basis of wheel sensor signal pulses at a first given timing. The first given timing is determined in view of response characteristics of an electromagnetic actuator of a pressure control valve in a hydraulic brake system. The anti-skid control system also performs arithmetic operations for deriving wheel acceleration on the basis of wheel speed sensor signal pulses at a second timing. The second timing is adjusted according to the sensor signal pulse frequency so that the difference between successive pulse intervals or the difference between the durations of successive sensor signal pulse groups exceeds a given value which is the threshold for performing wheel acceleration calculation to obtain a result useful in anti-skid control operation. Perferably, the anti-skid brake control system is provided with a plurality of digital processors, each of which is adapted to perform anti-skid brake control operations for a corresponding vehicle wheel or wheel set. Each of the digital processors can operate independently of the others and independently produces control signals for optimizing the braking characteristics of the corresponding wheel.

24 Claims, 31 Drawing Figures

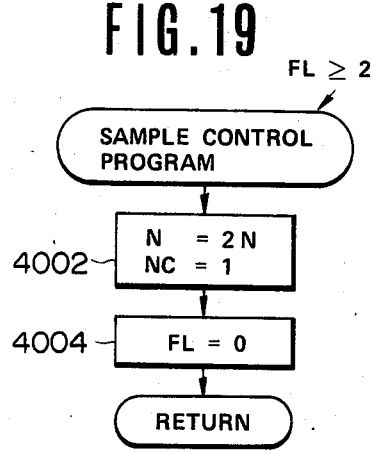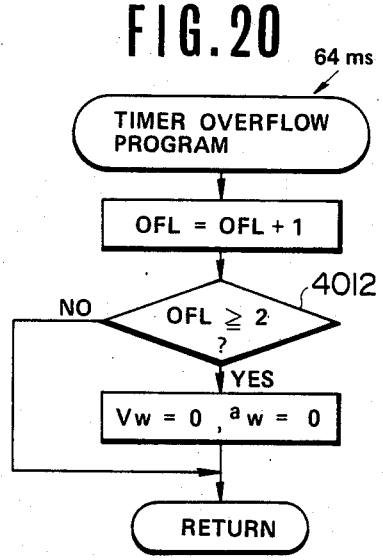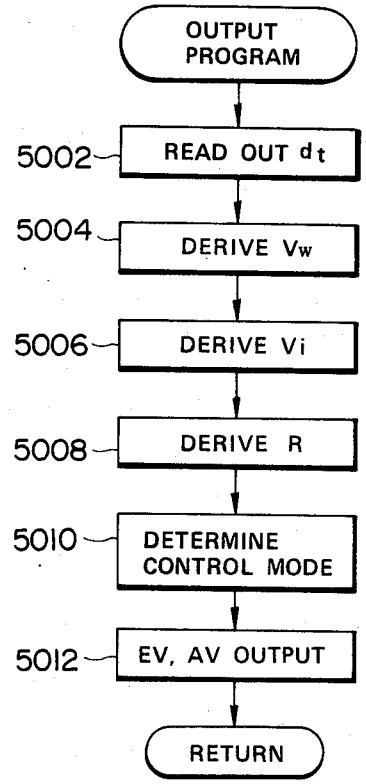

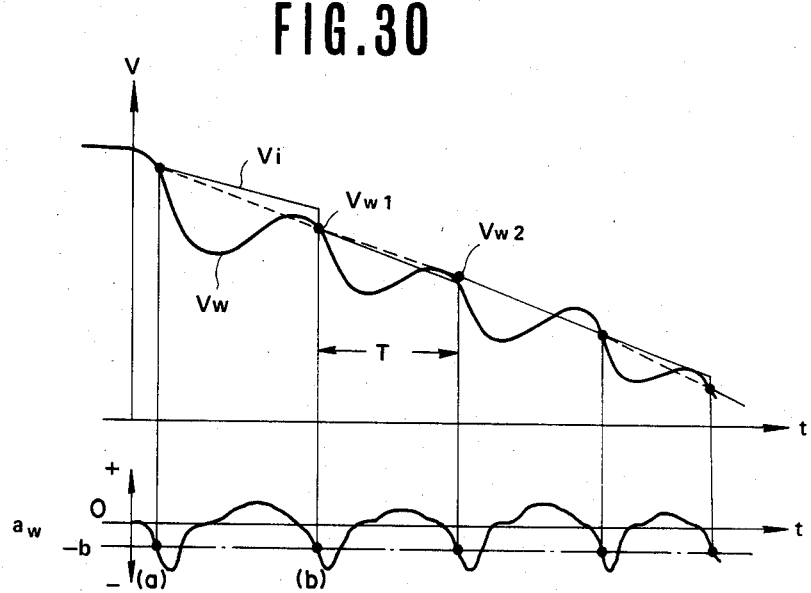

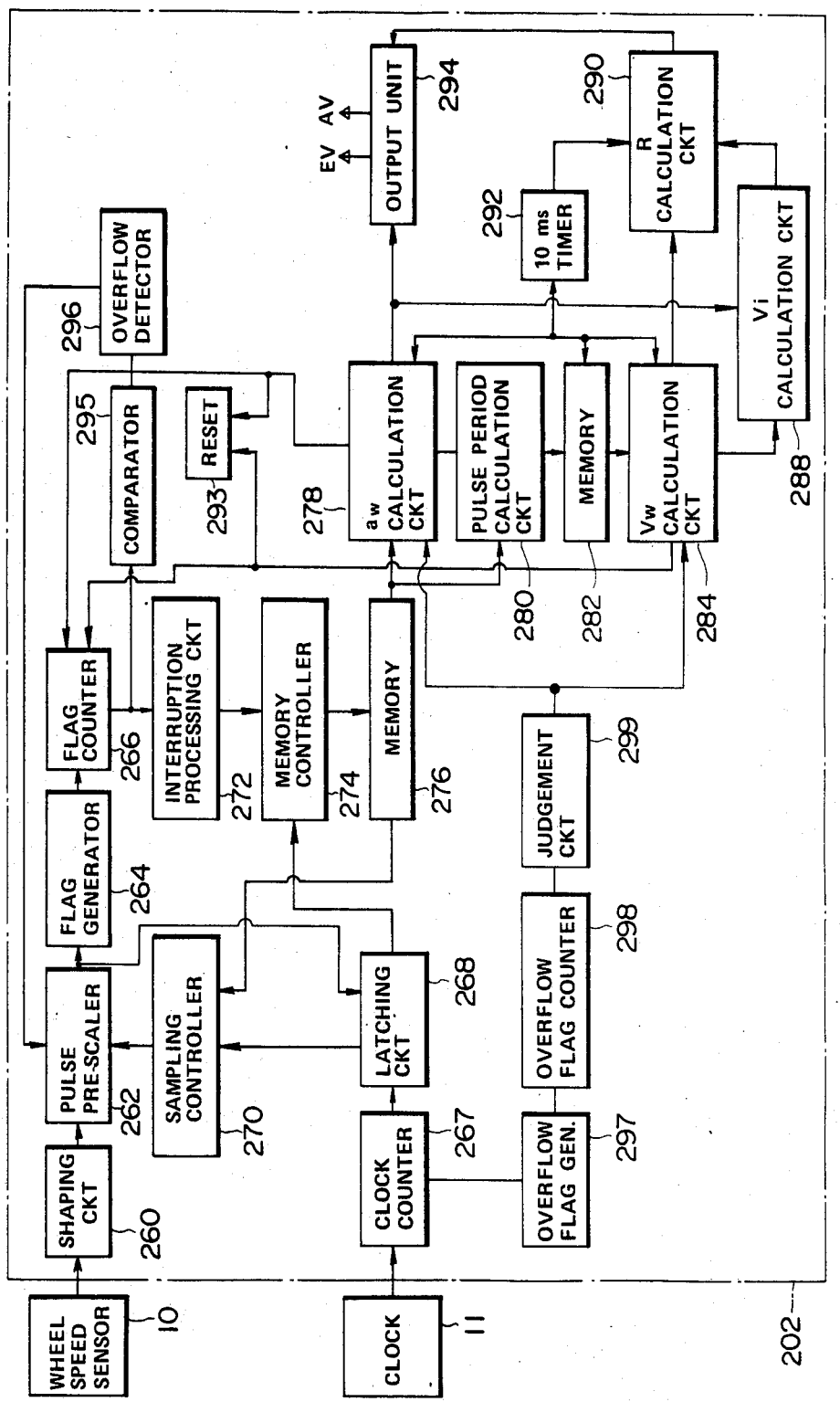

ANTI-SKID BRAKE CONTROL SYSTEM FOR AUTOMOTIVE VEHICLE

BACKGROUND OF THE INVENTION

The present invention relates generally to an anti-skid brake control system for an automotive vehicle, which independently controls the braking pressure to be applied to each vehicle wheel. More particularly, the invention relates to an anti-skid brake control system which can independently control the timing of arithmetic operations for deriving wheel speed and wheel acceleration in order to optimize the timing of arithmetic operations.

U.S. Pat. No. 4,315,213, issued on Feb. 9, 1982 to Manfred WOLFF, discloses a method for obtaining an acceleration or deceleration signal from a signal proportional to speed and apparatus therefor. The method for obtaining an acceleration or deceleration signal from a signal proportional to the speed consists of storing the n most recently ascertained changes in the speed signal in a memory, and upon ascertainment of a new change to be stored in memory, erasing the change which has been stored the longest, and forming a deceleration or acceleration signal by addition of the stored n changes periodically at intervals of dT. In this method, the occurrence of deceleration or acceleration exceeding the threshold is recognized quickly.

U.S. Pat. No. 4,267,575, issued on May 12, 1981 to Peter BOUNDS, discloses a system, which serves to provide signals to a microcomputer-based control system from which instantaneous values of speed can be computed, includes a wheel-driven alternator which provides an alternating current output whose frequency varies with wheel speed. A signal processor converts this signal to a series of sensor pulses whose width varies inversely with frequency. A sample pulse supplied by a microprocessor sets the period or length of time during which the sensor pulses are examined for each speed calculation cycle of the microprocessor. The sample period pulses are AND-gated with a high-frequency clock signal and also with the sensor pulses to provide a series of marker pulses marking the up and down excursions of the sensor pulses. The marker pulses occurring in each sample period are counted directly in a first counter, and in addition are supplied to a latch circuit and from thence to an AND gate which responds to the first marker pulse in the sample period to count occurrences of the first counter exceeding its capacity. A third counter is also connected to receive the high-frequency clock pulses and counts only the clock pulses occurring after the last marker pulse in the sample period. At the end of the sample period, the counts from all three counters are transferred to the microprocessor which uses this information to compute a value for wheel velocity over the sample period. The system continuously provides the input counts to enable the microprocessor to calculate wheel velocity over each sample period.

In another approach, U.S. Pat. No. 4,384,330 to Toshiro MATSUDA, issued on May 17, 1983 discloses a brake control system for controlling application and release of brake pressure in order to prevent the vehicle from skidding. The system includes a sensing circuit for determining wheel rotation speed, a deceleration detecting circuit for determining the deceleration rate of the wheel and generating a signal when the determined deceleration rate becomes equal to or greater than a predetermined value, a target wheel speed circuit for determining a target wheel speed based on the wheel rotation speed and operative in response to detection of a peak in the coefficient of friction between the vehicle wheel and the road surface, and a control circuit for controlling application and release of brake fluid pressure to wheel cylinders for controlling the wheel deceleration rate. The wheel rotation speed sensing circuit detects the angular velocity of the wheel to produce alternating current sensor signal having a frequency corresponding to the wheel rotation speed. The wheel rotation speed sensor signal value is differentiated to derive the deceleration rate.

Another approach for deriving acceleration has been disclosed in U.S. Pat. No. 3,943,345 issued on Mar. 9, 1976 to Noriyoshi ANDO et al. The system disclosed includes a first counter for counting the number of pulse signals corresponding to the rotational speed of a rotating body, a second counter for counting the number of pulses after the first counter stops counting, and a control circuit for generating an output signal corresponding to the difference between the counts of the first and second counters.

In the present invention, another approach has been taken to derive the wheel rotation speed which will be hereafter referred to as "wheel speed" based on input time data representative of the times at which wheel speed sensor signal pulses are produced. For instance, by latching a timer signal value in response to the leading edge of each sensor signal pulse, the intervals between occurrences of the sensor signal pulses can be measured. The intervals between occurrences of the sensor signal pulses are inversely proportional to the rotation speed of the wheel. Therefore, wheel speed can be derived by finding the reciprocal of the measured intervals. In addition, wheel acceleration and deceleration can be obtained by comparing successive intervals and dividing the obtained difference between intervals by the period of time over which the sensor signals were sampled.

To perform this procedure, it is essential to record the input timing in response to every sensor signal pulse. A difficulty is encountered due to significant variations in the sensor signal intervals according to significant variations in the vehicle speed. In recent years, modern vehicles can be driven at speeds in the range of about 0 km to 300 km. Sensor signal intervals vary in accordance with this wide speed range. In particular, when the vehicle is moving at a relatively high speed, the input intervals of the sensor signal pulses may be too short for the anti-skid control system to resolve. As accurate sampling of input timing is essential for the proposed approach, errors in the recorded input time data will cause errors or malfunction of the anti-skid brake control system. One possible source of error in sampling the input timing is accidentally missing one or more sensor signal pulses. Such errors are particularly likely to occur when the vehicle and wheel speeds are relatively high and therefore the intervals between adjacent sensor signal pulses are quite short.

U.S. Pat. No. 4,408,290, issued on Oct. 4, 1983 to the common inventor of this invention is intended to perform the foregoing input time data sampling for use in calculation of acceleration and deceleration. In the disclosure of the applicant's prior invention, an acceleration sensor acts on the variable-frequency pulses of a speed sensor signal to recognize any variation of the pulse period thereof and to produce an output indicative of the magnitude of the detected variation to within a fixed degree of accuracy. The durations of groups of pulses are held to within a fixed range by adjusting the number of pulses in each group. The duration of groups of pulses are measured with reference to a fixed-frequency clock pulse signal and the measurement periods of successive groups of equal numbers of pulses are compared. If the differences between pulse group periods is zero or less than a predetermined value, the number of pulses in each group is increased in order to increase the total number of clock pulses during the measurement interval. The number of pulses per group is increased until the difference between measured periods exceeds the predetermined value or until the number of pulses per group reaches a predetermined maximum. Acceleration data calculation and memory control procedure are designed to take into account the variation of the number of pulse per group.

The applicant's prior invention is effective for expanding intervals for sampling the input time data of the sensor pulse signals and for enabling the anti-skid control system to resolve variations in the wheel speeds.

In general, anti-skid brake control systems employ an electrically or electromagnetically operated actuator which operates a pressure control valve for controlling the brake pressure in a wheel cylinder. Such electrically operated actuators have specific response characteristics and mechanical or electrical time lags in response to control signals from a controller. Therefore, if the frequency of the control signals is too high for the actuator to follow, anti-skid control may not be performed effectively or accurately. As the actuators now available exhibit a minimum response time of approximately 10 ms, the control signals must be separated by at least 10 ms.

In addition, in order to derive a wheel acceleration value which is sufficiently large to use in anti-skid brake control operations, the wheel sensor pulses have to be grouped so as to produce a sufficiently large difference between the durations of successive groups, especially in a relatively high wheel speeds. It is to take as long as approximately 80 msec to obtain a sufficiently large difference between group durations. If such long duration are needed to perform arithmetic operations, longer than the sensor pulse period, thus accidentally skipping one or more wheel sensor pulses and resulting in errors in the result of arithmetic operations.

Therefore, in the prior art, it has been considered difficult to perform arithmetic operation or deriving control signals at a suitable timing in view of the response of the actuator and time delays due to wheel acceleration calculations.

SUMMARY OF THE INVENTION

Therefore, it is a principle object of the present invention to optimize anti-skid control operation to be performed by an anti-skid brake control system according to the present invention.

Another object of the present invention is to provide an anti-skid brake control system in which necessary arithmetic operations can be performed at a suitable timing.

A further and more specific object of the invention is to provide an anti-skid brake control system in which the timing of arithmetic operations for deriving wheel speed and wheel acceleration are controlled for optimum control operation.

In order to accomplish the above-mentioned and other objects, an anti-skid brake control system according to the present invention performs arithmetic operations for deriving wheel speed on the basis of wheel sensor signal pulses at a first given timing. The first given timing is determined in view of response characteristics of an electromagnetic actuator of a pressure control valve in a hydraulic brake system. The anti-skid control system also performs arithmetic operations for deriving wheel acceleration on the basis of wheel speed sensor signal pulses at a second timing. The second timing is adjusted according to the sensor signal pulse frequency so that the difference between successive pulse intervals or the difference between the durations of successive sensor signal pulse groups exceeds a given value which is the threshold for performing wheel acceleration calculation to obtain a result useful in anti-skid control operation.

Preferably, the anti-skid brake control system is provided a plurality of digital processors, each of which is adapted to perform anti-skid brake control operations for a corresponding vehicle wheel or wheel set. Each of the digital processors can operate independently of the others and independently produces control signals for optimizing the braking characteristics of the corresponding wheel.

BRIEF DESCRIPTION OF THE DRAWINGS

The present invention will be understood more fully from the detailed description given below and from the accompanying drawings of the preferred embodiments of the present invention, which, however, should not be taken to limit the invention to the specific embodiments, but are for explanation and understanding only.

FIG. 19 is a flowchart of a sample control program executed by the controller unit;

FIG. 20 is a flowchart of a timer overflow program executed periodically as an interrupt program of the main program;

FIG. 23 is a flowchart of an output calculation program for deriving EV and V signals for controlling operation mode of the electromagnetic valve according to the valve conditions of FIGS. 4, 5 and 6;

FIG. 30 shows the variation of wheel speed and wheel acceleration and deceleration as anti-skid brake control is performed according to the present invention; and FIG. 31 is a block diagram of another embodiment of the controller unit in the preferred embodiment of the anti-skid brake control system according to the present invention.

DESCRIPTION OF THE PREFERRED EMBODIMENTS

Figure 1:
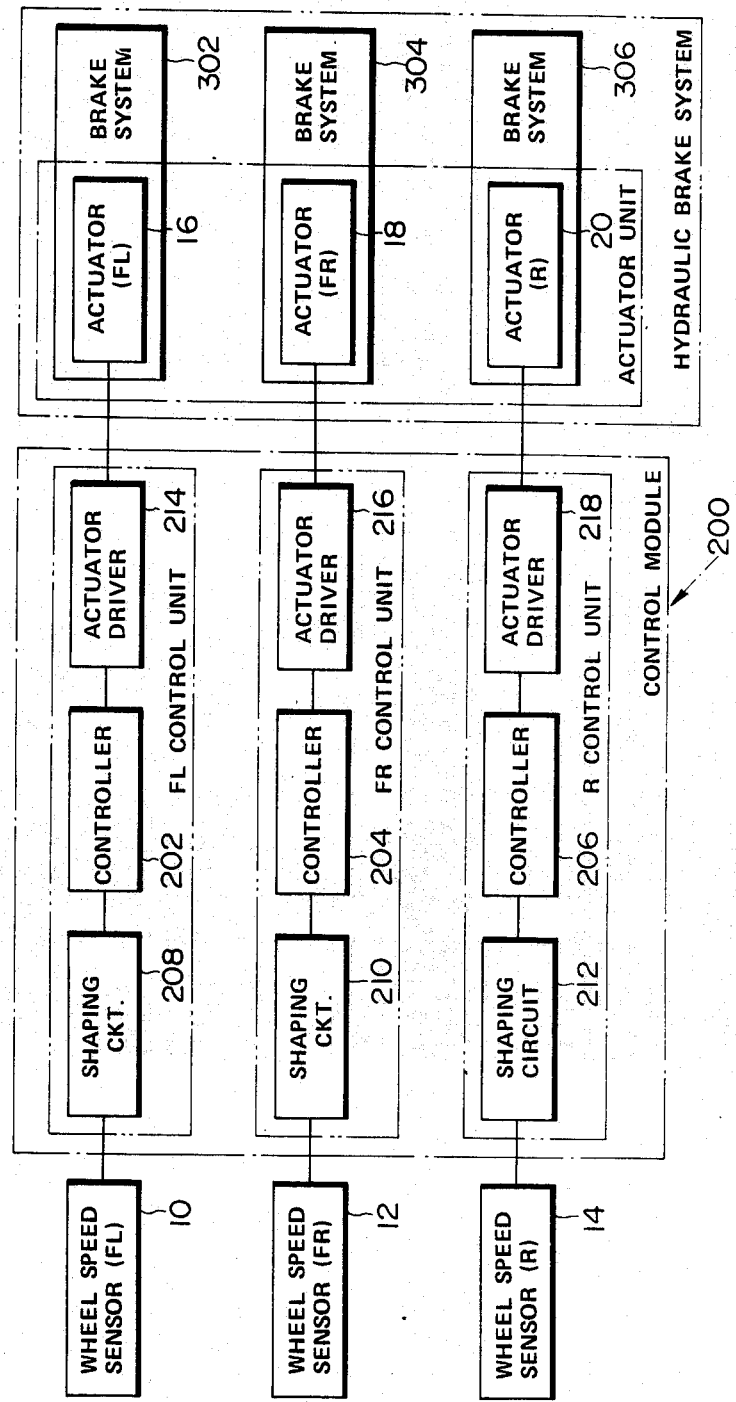
FIG. 1 is a schematic block diagram of the general design of the preferred embodiment of an anti-skid brake control system according to the present invention.

This application is one of eighteen mutually related co-pending Patent Applications in the United States, filed on the same day. All of the eighteen applications have been filed by the common applicant to this application and commonly assigned to the assignee of this application. The other seventeen applications are identified below:

| Basic Japanese Patent Appln No. Serial No. | Title of the Invention |
|---|---|
| Showa 58-70891 601,326, filed April 17,1984 | AN AUTOMOTIVE ANTI-SKID BRAKE CONTROL SYSTEM WITH SAMPLING INPUT TIME DATA OF WHEEL SPEED SENSOR SIGNALS |
| Showa 58-70892 601,375, filed April 17,1984 | METHOD AND SYSTEM FOR SAMPLING INPUT TIME DATA FOR WHEEL SPEED SENSOR IN AN AUTOMOTIVE ANTI-SKID BRAKE CONTROL SYSTEM |
| Showa 58-70893 601,325, filed April 17,1984 | AUTOMOTIVE ANTI-SKID CONTROL SYSTEM WITH CONTROL OF SAMPLING OF INPUT TIME DATA OF WHEEL SPEED SENSOR SIGNALS AND METHOD THEREFOR |
| Showa 58-70894 601,317, filed April 17,1984 | ANTI-SKID CONTROL SYSTEM FOR AUTOMOTIVE BRAKE SYSTEM WITH SAMPLE CONTROL FOR SAMPLING INPUT TIMING OF SENSOR SIGNAL PULSES WITH REQUIRED PROCESS IDENTIFICATION AND METHOD FOR SAMPLING |
| Showa 58-70895 601,294, filed April 17,1984 | ANTI-SKID BRAKE CONTROL SYSTEM INCLUDING A PROCEDURE OF SAMPLING OF INPUT TIME DATA OF WHEEL SPEED SENSOR SIGNALS AND METHOD THEREFOR |
| Showa 58-70896 601,344, filed April 17,1984 | ANTI-SKID BRAKE CONTROL SYSTEM INCLUDING WHEEL DECELERATION CALCULATION WITH SHORTER LAB-TIME AND METHOD FOR PERFORMING CALCULATION |
| Showa 58-70897 601,338, filed April 17,1984 | ANTI-SKID BRAKE CONTROL SYSTEM WITH SAMPLE CONTROL OF SENSOR SIGNAL INPUT TIME DATA, AND METHOD THEREFOR |
| Showa 58-70898 601,337, filed April 17,1984 | ANTI-SKID BRAKE CONTROL SYSTEM WITH CONTROL OF SAMPLING TIMING OF INPUT TIMING VALUES OF WHEEL SPEED SENSOR SIGNAL PULSES |
| Showa 58-70900 601,364, filed April 17,1984 | ANTI-SKID BRAKE CONTROL SYSTEM WITH REDUCED DURATION OF WHEEL ACCELERATION AND DECELERATION CALCULATION |
| Showa 58-84088 601,363, filed April 17,1984 | ANTI-SKID BRAKE CONTROL SYSTEM WITH OPERATIONAL MODE CONTROL AND METHOD THEREFOR |

-continued

| Basic Japanese Patent Appln No. Serial No. | Title of the Invention |
|---|---|
| Showa 58-84087 & 58-84091 601,329, filed April 17,1984 | ANTI-SKID BRAKE CONTROL SYSTEM WITH OPERATION CONTROL FOR A PRESSURE REDUCTION FLUID PUMP IN HYDRAULIC BRAKE CIRCUIT |
| Showa 58-84082 601,318, filed April 17,1984 | METHOD AND SYSTEM FOR DERIVING WHEEL ROTATION SPEED DATA FOR AUTOMOTIVE ANTI-SKID CONTROL |
| Showa 58-84085 601,345, filed April 17,1984 | METHOD AND SYSTEM FOR DERIVING WHEEL ACCELERATION AND DECELERATION IN AUTOMOTIVE ANTI-SKID BRAKE CONTROL SYSTEM |
| Showa 58-84092 601,293, filed April 17,1984 | ANTI-SKID BRAKE CONTROL SYSTEM AND METHOD FEATURING VEHICLE BATTERY PROTECTION |
| Showa 58-84081 601,327, filed April 17,1984 | METHOD AND SYSTEM FOR DERIVING WHEEL ROTATION SPEED DATA FOR AUTOMOTIVE ANTI-SKID CONTROL |
| Showa 58-84090 601,258, filed April 17,1984 now Patent No. 4,569,560 issued February 11,1986 | ANTI-SKID BRAKE CONTROL SYSTEM INCLUDING FLUID PUMP AND DRIVE CIRCUIT THEREFOR |
| Showa 58-102919 & 58-109308 601,295, filed April 17,1984 | ANTI-SKID BRAKE CONTROL SYSTEM WITH A PLURALITY OF INDEPENDENTLY OPERATIVE DIGITAL CONTROLLERS |

Disclosures of other seventeen applications as identified above are hereby incorporated by reference for the sake of disclosure.

Referring now to the drawings, particularly to FIG. 1, the preferred embodiment of an anti-skid control system according to the present invention includes a control module 200 including a front-left controller unit (FL) 202, a front-right controller unit (FR) 204 and a rear controller unit (R) 206. The controller unit 202 comprises a microprocessor and is adapted to control brake pressure applied to a front left wheel cylinder 30a of a front left hydraulic brake system 302 of an automotive hydraulic brake system 300. Similarly, the controller unit 204 is adapted to control brake pressure applied to the wheel cylinder 34a of a front right wheel (not shown) in the front right hydraulic brake system 304 and the controller unit 206 is adapted to control brake pressure applied to the rear wheel cylinders 38a of the hydraulic rear brake system 306. Respective brake systems 302, 304 and 306 have electromagnetically operated actuators 16, 18 and 20, each of which controls the pressure of working fluid in the corresponding wheel cylinders. By means of the controlled pressure, the wheel cylinders 30a, 34a and 38a apply braking force to brake disc rotors 28, 32 and 36 mounted on the corresponding wheel axles for rotation with the corresponding vehicle wheels via brake shoe assemblies 30, 34 and 38.

Though the shown brake system comprises disc brakes, the anti-skid control system according to the present invention can also be applied to drum-type brake systems.

The controller units 202, 204 and 206 are respectively associated with actuator drive circuits 214, 216 and 218 to control operations of corresponding actuators 16, 18 and 20. In addition, each of the controller units 202, 204 and 206 is connected to a corresponding wheel speed sensor 10, 12 and 14 via shaping circuits 208, 210 and 212 incorporated in the controller 200. Each of the wheel speed sensors 10, 12 and 14 is adapted to produce an alternating-current sensor signal having a frequency related to or proportional to the rotation speed of the corresponding vehicle wheel. Each of the A-C sensor signals is converted by the corresponding shaping circuit 208, 210 and 212 into a rectangular pulse signal which will be hereafter referred to as "sensor pulse signal". As can be appreciated, since the frequency of the A-C sensor signals is proportional to the wheel speed, the frequency of the sensor pulse signal should correspond to the wheel rotation speed and the pulse intervals thereof will be inversely proportional to the wheel rotation speed.

The controller units 202, 204 and 206 operate independently and continuously process the sensor pulse signal to derive control signals for controlling the fluid pressure in each of the wheel cylinders 30a, 34a and 38a in which a way that the slip rate R at each of the vehicle wheels is optimized to shorten the distance required to stop the vehicle, which distance will be hereafter referred to as "braking distance".

In general, each controller unit 202, 204 and 206 monitors receipt of the corresponding sensor pulses so that it can derive the pulse interval between the times of receipt of successive sensor pulses. Based on the derived pulse interval, the controller units 202, 204 and 206 calculate instantaneous wheel speed $V_w$ and instantaneous wheel acceleration or deceleration $a_w$. From these measured and derived values, a target wheel speed $V_i$ is derived, which is an assumed value derived from the wheel speed at which a slip is assumed to be zero or approximately zero. The target wheel speed $V_i$ varies at a constant decelerating rate derived from variation of the wheel speed. The target wheel speed thus corresponds to a vehicle speed which itself is based on variation of the wheel speed. Based on the difference between the instantaneous wheel speed $V_w$ and the target wheel speed $V_j$, a slip rate R is derived. The controller units 202, 204 and 206 determine the appropriate operational mode for increasing, decreasing or holding the hydraulic brake pressure applied to the wheel cylinders 30a, 34a and 38a. The control mode in which the brake pressure is increased will be hereinafter referred to as "application mode". The control mode in which the brake pressure is decreased will be hereafter referred to as "release mode". The mode in which the brake pressure is held essentially constant will be hereinafter referred to as "hold mode". The anti-skid control operation consists of a loop of the application mode, hold mode, release mode and hold mode. This loop is repeated throughout the anti-skid brake control operation cyclically. One cycle of the loop of the control variation will be hereafter referred to as "skid cycle".

Figure 2:
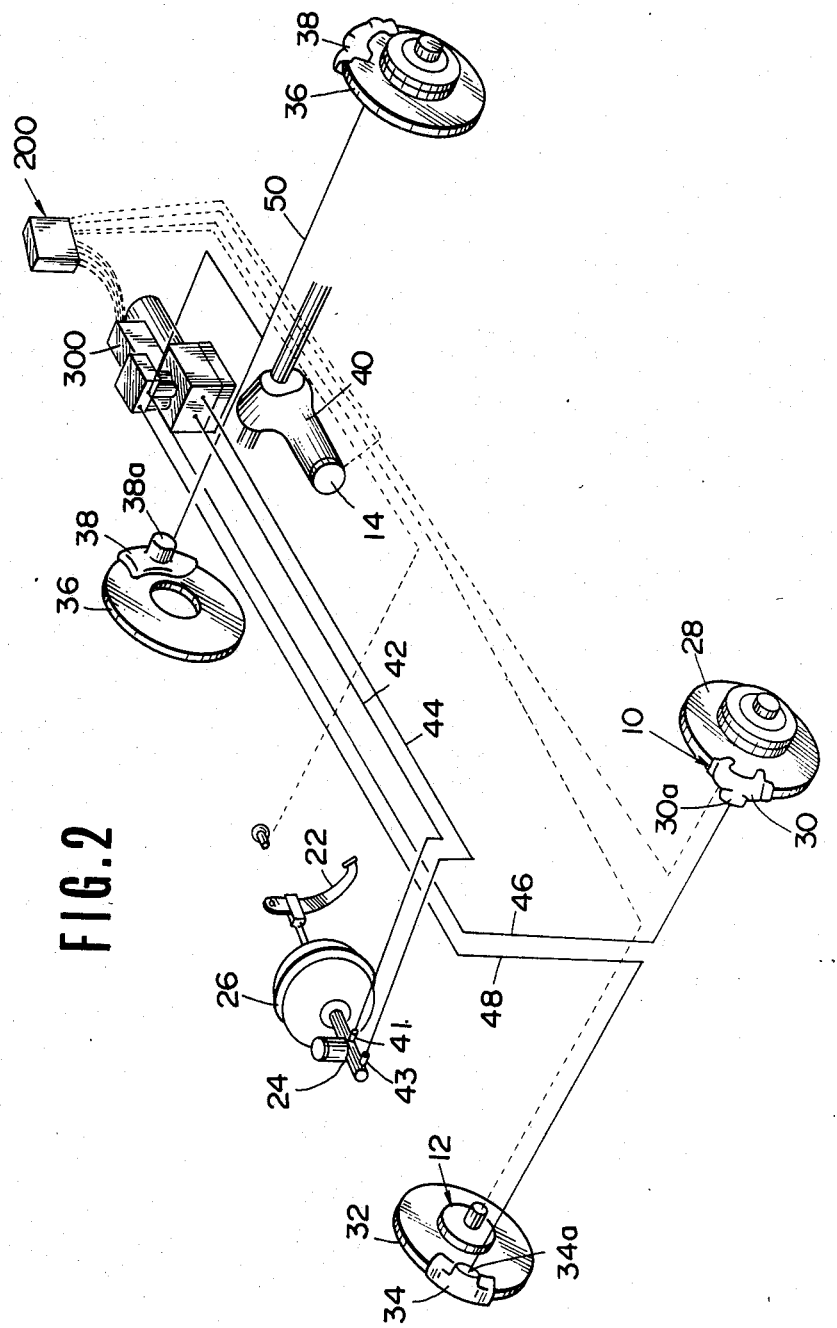
FIG. 2 is a perspective illustration of the hydraulic circuits of the anti-skid brake system according to the present invention.

FIG. 2 shows portions of the hydraulic brake system of an automotive vehicle to which the preferred embodiment of the anti-skid control system is applied. The wheel speed sensors 10 and 12 are respectively provided adjacent the brake disc rotor 28 and 32 for rotation therewith so as to produce sensor signals having frequencies proportional to the wheel rotation speed and variable in accordance with variation of the wheel speed. On the other hand, the wheel speed sensor 14 is provided adjacent a propeller shaft near the differential gear box or drive pinion shaft 116 for rotation therewith. (See FIG. 8) Since the rotation speeds of the left and right rear wheels are free to vary independently depending upon driving conditions due to the effect of the differential gear box 40, the rear wheel speed detected by the rear wheel speed sensor 14 is the average of the speeds of the left and right wheels. Throughout the specification, "rear wheel speed" will mean the average rotation speed of the left and right rear wheels.

As shown in FIG. 2, the actuator unit 300 is connected to a master wheel cylinder 24 via primary and secondary outlet ports 41 and 43 thereof and via pressure lines 44 and 42. The master wheel cylinder 24 is, in turn, associated with a brake pedal 22 via a power booster 26 which is adapted to boost the braking force applied to the brake pedal 22 before applying same to the master cylinder. The actuator unit 300 is also connected to wheel cylinders 30a, 34a and 38a via brake pressure lines 46, 48 and 50.

Figure 3:
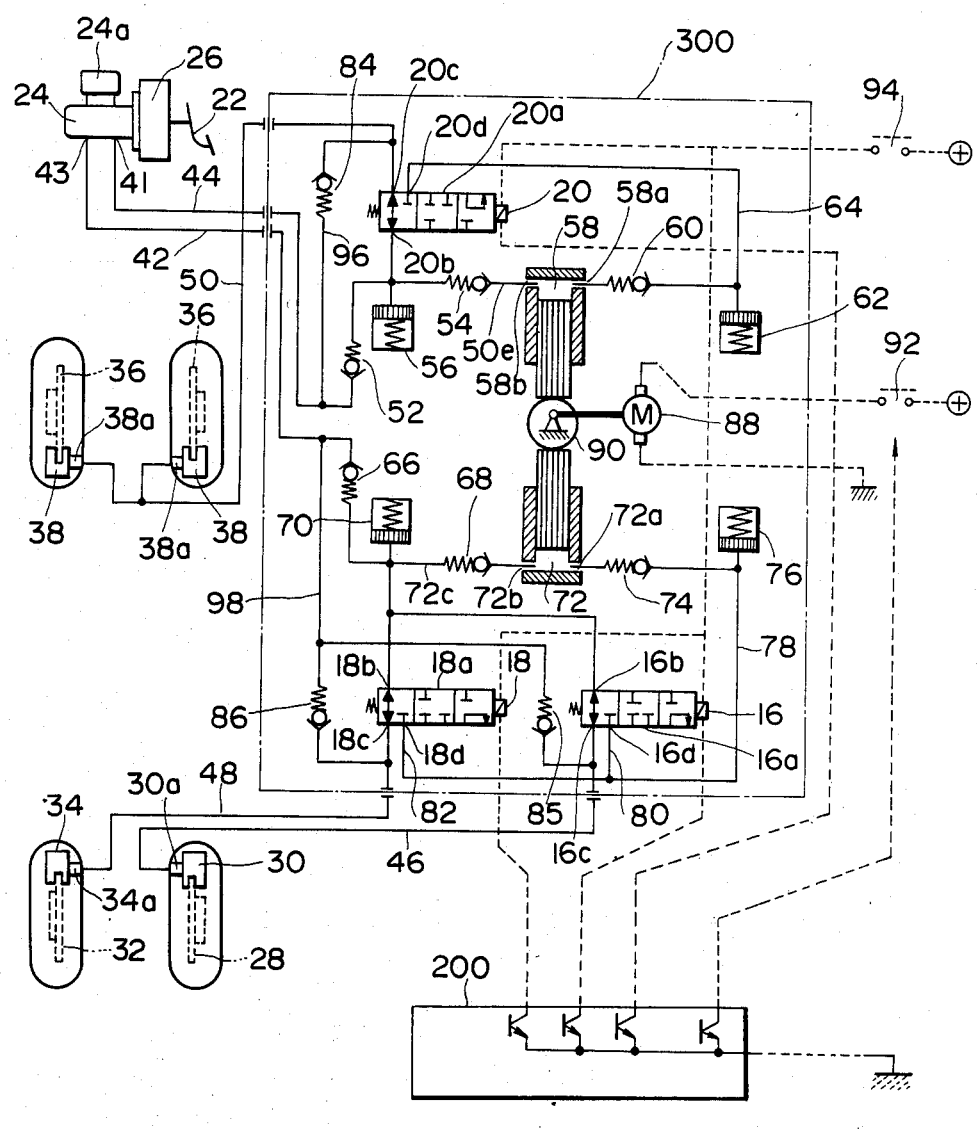
FIG. 3 is a circuit diagram of the hydraulic circuits performing the anti-skid control according to the present invention.

The circuit lay-out of the hydraulic brake system circuit will be described in detail below with reference to FIG. 3 which is only an example of the hydraulic brake system to which the preferred embodiment of the anti-skid control system according to the present invention can be applied, and so it should be appreciated that it is not intended to limit the hydraulic system to the embodiment shown. In FIG. 3, the secondary outlet port 43 is connected to the inlet ports 16b and 18b of electromagnetic flow control valves 16a and 18a, the respective outlet ports 16c and 18c of which are connected to corresponding left and right wheel cylinders 30a and 34a, via the secondary pressure line lines 46 and 48. The primary outlet port 41 is connected to the inlet port 20b of the electromagnetic valve 20a, the outlet port 20c of which is connected to the rear wheel cylinders 38a, via a primary pressure line 50. The electromagnetic valves 16a, 18a and 20a also have drain ports 16d, 18d and 20d. The drain ports 16d and 18d are connected to the inlet port 72a of a fluid pump 90 via drain passages 80, 82 and 78. The fluid pump 90 is associated with an electric motor 88 to be driven by the latter which is, in turn, connected to a motor relay 92, the duty cycle of which is controlled by means of a control signal from the control module 200. While the motor relay 92 is energized to be turned ON, the motor 88 is in operation to drive the fluid pump 90. The drain port 20d of the electromagnetic flow control valve 20a is connected to the inlet port 58a of the fluid pump 90 via a drain passage 64.

The outlet ports 72b and 58b are respectively connected to the pressure lines 42 and 44 via a return passages 72c and 58c. The outlet ports 16c, 18c and 20c of respective electromagnetic flow control valves 16a, 18a and 20a are connected to corresponding wheel cylinders 30a, 34a and 38a via braking lines 46, 48 and 50. Bypass passages 96 and 98 are provided to connect the braking pressure lines 46 and 48, and 50 respectively to the pressure lines 42 and 44, bypassing the electromagnetic flow control valves.

Pump pressure check valves 52 and 66 are installed in the pressure lines 42 and 44. Each of the pump pressure check valves 66 and 52 is adapted to prevent the working fluid pressurized by the fluid pump 90 from transmitting pressure surges to the master cylinder 24. Since the fluid pump 90 is designed for quick release of the braking pressure in the braking pressure lines 46, 48 and 50 and thus releasing the wheel cylinders 30a, 34a and 38a from the braking pressure, it is driven upon release of the brake pedal. This would result in pressure surges in the working fluid from the fluid pump 90 to the master cylinder 24 if the pump pressure check valves 66 and 52 were not provided. The pump pressure check valves 66 and 52 serve as one-way check valves allowing fluid flow from the master cylinder 24 to the inlet ports 16b, 18b and 20b of the electromagnetic valves 16a, 18a and 20a. Pressure accumulators 70 and 56 are installed in the pressure lines 42 and 44, which pressure accumulators serve to accumulate fluid pressure generated at the outlet ports 72b and 58b of the fluid pump 90 while the inlet ports 16b, 18b and 20b are closed. Toward this end, the pressure accumulators 70 and 56 are connected to the outlet ports 72b and 58b of the fluid pump 90 via the return passages 72c and 58c. Outlet valves 68 and 54 are one-way check valves allowing one-way fluid communication from the fluid pump to the pressure accumulators. These outlet valves 68 and 54 are effective for preventing the pressure accumulated in the pressure accumulators 70 and 56 from surging to the fluid pump when the pump is deactivated. In addition, the outlet valves 68 and 54 are also effective to prevent the pressurized fluid flowing through the pressure lines 42 and 44 from flowing into the fluid pump 90 through the return passages 72c and 58c.

Inlet check valves 74 and 60 are inserted in the drain passages 78 and 64 for preventing surge flow of the pressurized fluid in the fluid pump 90 to the electromagnetic flow control valves 16a, 18a and 20a after the braking pressure in the wheel cylinders is released. The fluid flowing through the drain passages 78 and 64 is temporarily retained in fluid reservoirs 76 and 62 connected to the former.

Bypass check valves 85, 86 and 84 are inserted in the bypass passages 98 and 96 for preventing the fluid in the pressure lines 42 and 44 from flowing to the braking pressure lines 46, 48 and 50 without first passing through the electromagnetic flow control valves 16a, 18a and 20a. On the other hand, the bypass valves 85, 86 and 84 are adapted to permit fluid flow from the braking pressure line 46, 48 and 50 to the pressure lines 42 and 44 when the master cylinder 24 is released and thus the line pressure in the pressure lines 42 and 44 becomes lower than the pressure in the braking pressure lines 46, 48 and 50.

The electromagnetic flow control valves 16a, 18a and 20a are respectively associated with the actuators 16, 18 and 20 to be controlled by means of the control signals from the control module 200. The actuators 16, 18 and 20 are all connected to the control module 200 via an actuator relay 94, which thus controls the energization and deenergization of them all. Operation of the electromagnetic valve 16a in cooperation with the actuator 16 will be illustrated with reference to FIGS. 4, 5 and 6, in particular illustrating the application mode, hold mode and release mode, respectively.

It should be appreciated that the operation of the electromagnetic valves 18a and 20a are substantially the same as that of the valve 16a. Therefore, disclosure of the valve operations of the electromagnetic valves 18a and 20a is omitted in order to avoid unnecessary repetition and for simplification of the disclosure.

APPLICATION MODE

In this position, the actuator 16 remains deenergized. An anchor of the electromagnetic valve 16a thus remains in its initial position allowing fluid flow between the inlet port 16b and the outlet port 16c so that the pressurized fluid supplied from the master cylinder 24 via the pressure line 42 may flow to the left front wheel cylinder 30a via the braking pressure line 46. In this valve position, the drain port 16d is closed to block fluid flow from the pressure line 42 to the drain passage 78. As a result, the line pressure in the braking pressure line 46 is increased in proportion to the magnitude of depression of the brake pedal 22 and thereby the fluid pressure in the left front wheel cylinder 30a is increased correspondingly.

In this case, when the braking force applied to the brake pedal is released, the line pressure in the pressure line 42 drops due to return of the master cylinder 24 to its initial position. As a result, the line pressure in the braking pressure line 46 becomes higher than that in the pressure line 42 and so opens the bypass valve 85 to permit fluid flow through the bypass passage 98 to return the working fluid to the fluid reservoir 24a of the master cylinder 24.

In the preferring construction, the pump pressure check valve 66, normally serving as a one-way check valve for preventing fluid flow from the electromagnetic valve 16a to the master cylinder 24, becomes wide-open in response to drop of the line pressure in the pressure line below a given pressure. This allows the fluid in the braking pressure line 46 to flow backwards through the electromagnetic valve 16a and the pump pressure check valve 66 to the master cylinder 24 via the pressure line 42. This function of the pump pressure check valve 66 facilitates full release of the braking pressure in the wheel cylinder 30a.

For instance, the bypass valve 85 is rated at a given set pressure, e.g. 2 kg/cm$^2$ and closes when the pressure difference between the pressure line 42 and the braking pressure line 46 drops below the set pressure. As a result, fluid pressure approximating the bypass valve set pressure tends to remain in the braking pressure line 46, preventing the wheel cylinder 30a from returning to the fully released position. In order to avoid this, in the shown embodiment, the one-way check valve function of the pump pressure check valve 66 is disabled when the line pressure in the pressure line 42 drops below a predetermined pressure, e.g. 10 kg/cm$^2$. When the line pressure in the pressure line 42 drops below the predetermined pressure, a bias force normally applied to the pump pressure check valve 66 is released, freeing the valve to allow fluid flow from the braking pressure line 46 to the master cylinder 24 via the pressure line 42.

HOLD MODE

In this control mode, a limited first value, e.g. 2A of electric current serving as the control signal is applied to the actuator 16 to position the anchor closer to the actuator 16 than in the previous case. As a result, the inlet port 16b and the drain port 16d are closed to block fluid communication between the pressure line 42 and the braking pressure line 46 and between the braking pressure line and the drain passage 78. Therefore, the fluid pressure in the braking pressure line 46 is held at the level extant at the moment the actuator is operated by the control signal.

In this case, the fluid pressure applied through the master cylinder flows through the pressure check valve 66 to the pressure accumulator 70.

RELEASE MODE

In this control mode, a maximum value, e.g. 5A of electric current serving as the control signal is applied to the actuator 16 to shift the anchor all the way toward the actuator 16. As a result, the drain port 16d is opened to establish fluid communication between the drain port 16d and the outlet port 16c. At this time, the fluid pump 90 serves to facilitate fluid flow from the braking pressure line 46 to the drain passage 78. The fluid flowing through the drain passage is partly accumulated in the fluid reservoir 76 and the remainder flows to the pressure accumulator 70 via the check valves 60 and 54 and the fluid pump 90.

It will be appreciated that, even in this release mode, the fluid pressure in the pressure line 42 remains at a level higher or equal to that in the braking pressure line 46, so that fluid flow from the braking pressure line 46 to the pressure line 42 via the bypass passage 98 and via the bypass check valve 85 will never occur.

In order to resume the braking pressure in the wheel cylinder (FL) 30a after once the braking pressure is reduced by positioning the electromagnetic valve 16a in the release position, the actuator 16 is again deenergized. The electromagnetic valve 16a is thus returns to its initial position to allow the fluid flow between the inlet port 16b and the outlet port 16c so that the pressurized fluid may flow to the left front wheel cylinder 30a via the braking pressure line 46. As set forth the drain port 16d is closed to block fluid flow from the pressure line 42 to the drain passage 78.

As a result, the pressure accumulator 70 is connected to the left front wheel cylinder 30a via the electromagnetic valve 16a and the braking pressure line 46. The pressurized fluid in the pressure accumulator 70 is thus supplied to the wheel cylinder 30a so as to resume the fluid pressure in the wheel cylinder 30a.

At this time, as the pressure accumulator 70 is connected to the fluid reservoir 76 via the check valves 60 and 54 which allow fluid flow from the fluid reservoir to the pressure accumulator, the extra amount of pressurized fluid may be supplied from the fluid reservoir.

The design of the wheel speed sensors 10, 12 and 14 employed in the preferred embodiment of the anti-skid control system will be described in detail with reference to FIGS. 7 to 9.

Figure 7:
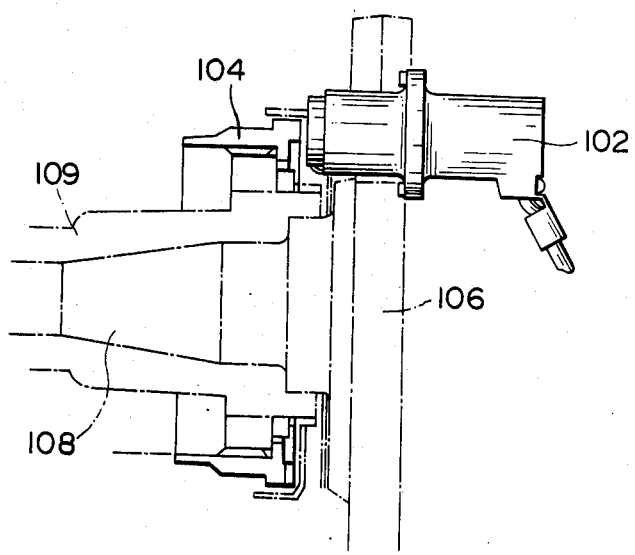
FIG. 7 is a perspective view of a wheel speed sensor adapted to detect the speed of a front wheel.

FIG. 7 shows the structure of the wheel speed sensor 10 for detecting the rate of rotation of the left front wheel. The wheel speed sensor 10 generally comprises a sensor rotor 104 adapted to rotate with the vehicle wheel, and a sensor assembly 102 fixedly secured to the shim portion 106 of the knuckle spindle 108. The sensor rotor 104 is fixedly secured to a wheel hub 109 for rotation with the vehicle wheel.

Figure 9:
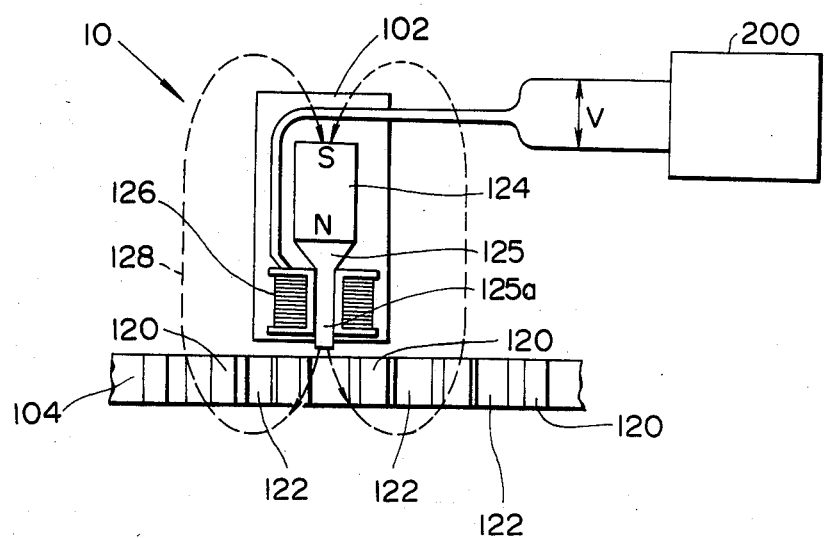
FIG. 9 is an explanatory illustration of the wheel speed sensors of FIGS. 7 and 8.
Figure 10:
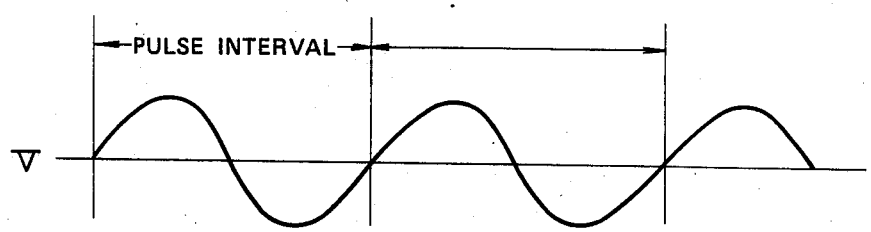
FIG. 10 shows the waveform of an alternating current sensor signal produced by the wheel speed sensor.

As shown in FIG. 9, the sensor rotor 104 is formed with a plurality of sensor teeth 120 at regular angular intervals. The width of the teeth 120 and the grooves 122 therebetween are equal in the shown embodiment and define a unit angle of wheel rotation. The sensor assembly 102 comprises a magnetic core 124 aligned with its north pole (N) near the sensor rotor 104 and its south pole (S) distal from the sensor rotor. A metal element 125 with a smaller diameter section 125a is attached to the end of the magnetic core 124 nearer the sensor rotor. The free end of the metal element 125 faces the sensor teeth 120. An electromagnetic coil 126 encircles the smaller diameter section 125a of the metal element. The electromagnetic coil 126 is adapted to detect variations in the magnetic field generated by the magnetic core 124 to produce an alternating-current sensor signal as shown in FIG. 10. That is, the metal element and the magnetic core 124 form a kind of proximity switch which adjusts the magnitude of the magnetic field depending upon the distance between the free end of the metal element 125 and the sensor rotor surface. Thus, the intensity of the magnetic field fluctuates in relation to the passage of the sensor teeth 120 and accordingly in relation to the angular velocity of the wheel.

It should be appreciated that the wheel speed sensor 12 for the right front wheel has the substantially the same structure as the set forth above. Therefore, explanation of the structure of the right wheel speed sensor 12 will be omitted in order to avoid unnecessary repetition in the disclosure and in order to simplify the description.

Figure 8:
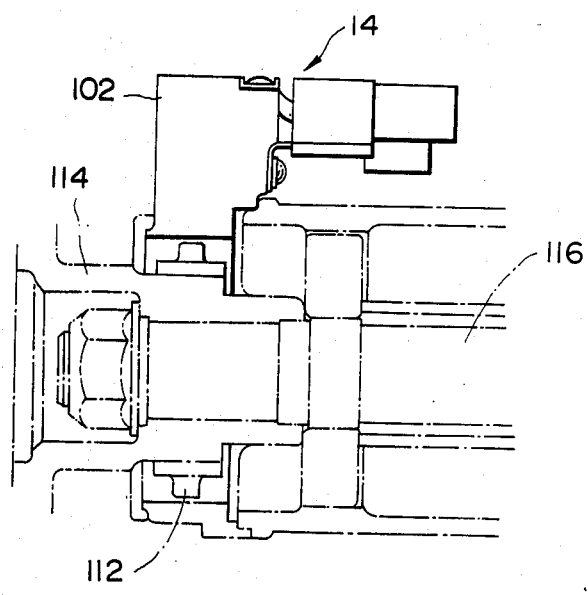
FIG. 8 is a side elevation of a wheel speed sensor adapted to detect the speed of a rear wheel.

FIG. 8 shows the structure of the rear wheel speed sensor 14. As with the aforementioned left front wheel speed sensor 10, the rear wheel speed sensor 14 comprises a sensor rotor 112 and a sensor assembly 102. The sensor rotor 112 is associated with a companion flange 114 which is, in turn, rigidly secured to a drive shaft 116 for rotation therewith. Thus, the sensor rotor 112 rotates with the drive shaft 116. The sensor assembly 102 is fixed to a final drive housing or a differential gear box (not shown).

Each of the sensor assemblies applied to the left and right front wheel speed sensors and the rear wheel sensor is adapted to output an alternating-current sensor signal having a frequency proportional to or corresponding to the rotational speed of the corresponding vehicle wheel. The electromagnetic coil 126 of each of the sensor assemblies 102 is connected to the control module 200 to supply the sensor signals thereto.

As set forth above, the control module 200 comprises the controller unit (FL) 202, the controller unit (FR) 204 and the controller unit (R) 206, each of which comprises a microcomputer. Therefore, the wheel speed sensors 10, 12 and 14 are connected to corresponding controller units 202, 204 and 206 and send their sensor signals thereto. Since the structure and operation of each of the controller units is substantially the same as that of the others, the structure and operation of only the controller unit 202 for performing the anti-skid brake control for the front left wheel cylinder will be explained in detail.

Figure 11:
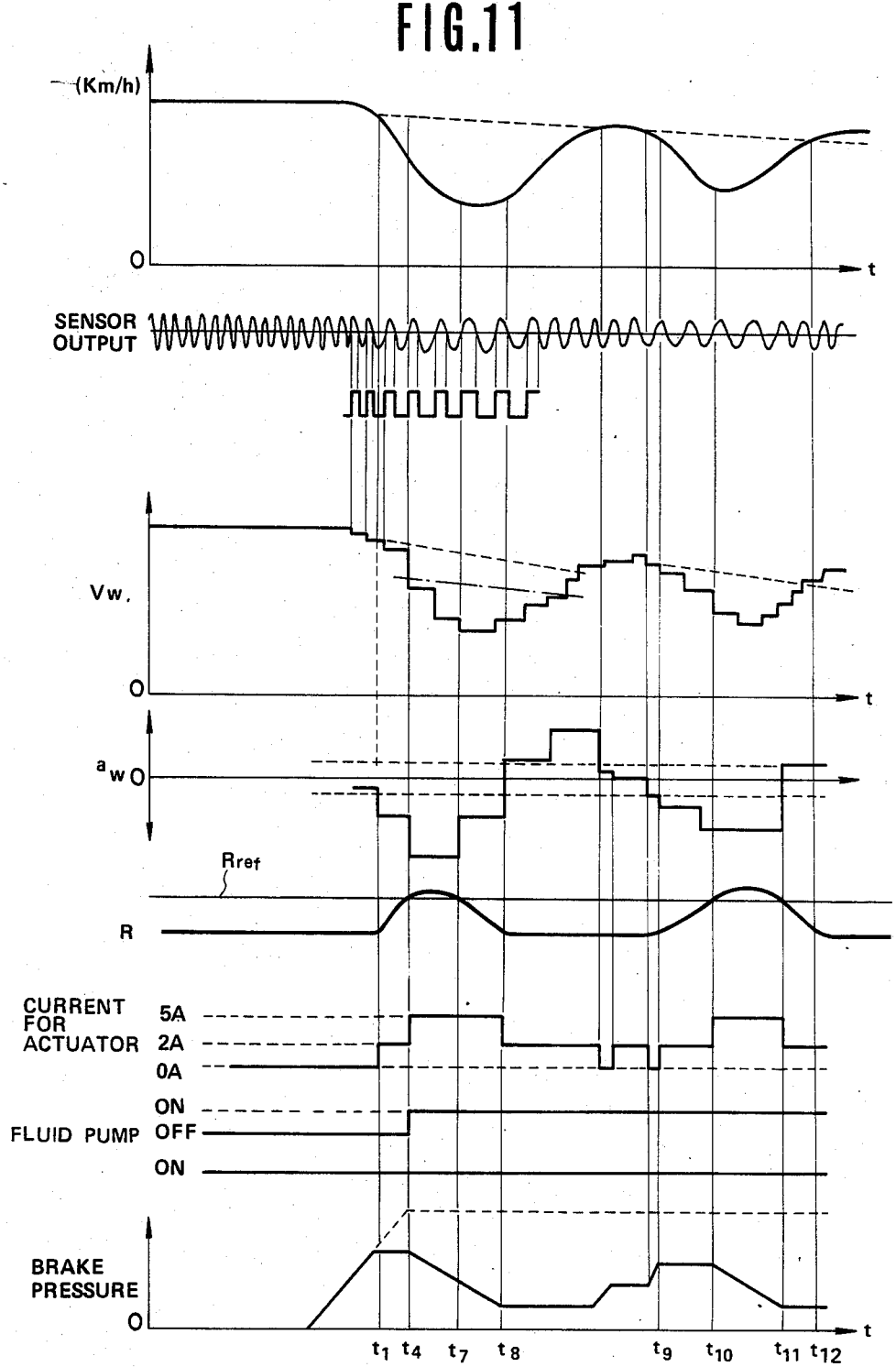
FIG. 11 is a timing chart for the anti-skid control system.

FIG. 11 is a timing chart of the anti-skid control performed by the controller unit 202. As set forth above, the alternating-current sensor signal output from the wheel speed sensor 10 is converted into a rectangular pulse train, i.e. as the sensor pulse signal mentioned above. The controller unit 202 monitors occurrences of sensor pulses and measures the intervals between individual pulses or between the first pulses of groups of relatively-high-frequency pulses. Pulses are so grouped that the measured intervals will exceed a predetermined value, which value will be hereafter referred to as "pulse interval threshold".

The wheel rotation speed $V_w$ is calculated in response to each sensor pulse. As is well known, the wheel speed is generally inversely proportional to the intervals between the sensor pulses, and accordingly, the wheel speed $V_w$ is derived from the interval between the last sensor pulse input time and the current sensor pulse input time. A target wheel speed is designated $V_i$ and the resultant wheel speed is designated $V_w$. In addition, the slip rate is derived from the rate of change of the wheel speed and an projected speed $V_v$ which is estimated from the wheel speed at the moment the brakes are applied based on the assumption of a continuous, linear deceleration without slippage. In general, the target wheel speed $V_i$ is derived from the wheel speed of the last skid cycle during which the wheel deceleration rate was equal to or less than a given value which will be hereafter referred to as "deceleration threshold $a_{ref}$", and the wheel speed of the current skid cycle, and by estimating the rate of change of the wheel speed between wheel speeds at which the rate of deceleration is equal to or less than the deceleration threshold. In practice, the first target wheel speed $V_i$ is derived based on the projected speed $V_v$ which corresponds to a wheel speed at the initial stage of braking operation and at which wheel deceleration exceeds a predetermined value, e.g. $-1.2G$, and a predetermined deceleration rate, for example 0.4G. The subsequent target wheel speed $V_i$ is derived based on the projected speeds $V_v$ in last two skid cycles. For instance, the deceleration rate of the target wheel speed $V_i$ is derived from a difference of the projected speeds $V_v$ in the last two skid cycle and a period of time in which wheel speed varies from the first projected speed to the next projected speed. Based on the last projected speed and the deceleration rate, the target wheel speed in the current skid cycle is derived.

The acceleration and deceleration of the wheel is derived based on the input times of three successive sensor pulses. Since the interval of the adjacent sensor signal pulses corresponds to the wheel speed, and the wheel speed is a function of the reciprocal of the interval, by comparing adjacent pulse-to-pulse intervals, a value corresponding to the variation or difference of the wheel speed may be obtained. The resultant interval may be divided by the period of time of the interval in order to obtain the wheel acceleration and deceleration at the unit time. Therefore, the acceleration or deceleration of the wheel is derived from the following equation:

$$a_w = \left(\frac{1}{C-B} - \frac{1}{B-A}\right) / \left(\frac{C-A}{2}\right) \quad (1)$$

where A, B and C are the input times of the sensor pulses in the order given.

On the other hand, the slip rate R is a rate and difference of wheel speed relative to the vehicle speed which is assumed as substantially corresponding to the target wheel speed. Therefore, in the shown embodiment, the target wheel speed $V_i$ is taken as variable or parameter indicative of the assumed or projected vehicle speed. The slip rate R can be obtained by dividing a difference between the target wheel speed $V_i$ and the instantaneous wheel speed $V_w$ by the target wheel speed. Therefore, in addition, the slip rate R is derived by solving the following equation:

$$R = (V_i - V_w)/V_i \qquad (2)$$

Finally, the controller unit 202 determines the control mode, i.e., release mode, hold mode and application mode from the slip rate R and the wheel acceleration or deceleration $a_w$.

General operation of the controller unit 202 will be briefly explained herebelow with reference to FIG. 11. Assuming the brake is applied at $t_0$ and the wheel deceleration $a_w$ exceeds the predetermined value, e.g. 1.2G at a time $t_1$, the controller unit 202 starts to operate at a time $t_1$. The first sensor pulse input time ($t_1$) is held in the controller unit 202. Upon receipt of the subsequent sensor pulse at a time $t_2$, the wheel speed $V_w$ is calculated by deriving the current sensor pulse period ($dt = t_2 - t_1$). In response to the subsequently received sensor pulses at times $t_3$, $t_4$ ..., the wheel speed values $V_{w2}$, $V_{w3}$ ... are calculated.

On the other hand, at the time $t_1$, the instantaneous wheel speed is taken as the projected speed $V_v$. Based on the projected speed $V_v$ and the predetermined fixed value, e.g. 0.4G, the target wheel speed $V_i$ decelerating at the predetermined deceleration rate 0.4G is derived.

In anti-skid brake control, the braking force applied to the wheel cylinder is to be so adjusted that the peripheral speed of the wheel, i.e. the wheel speed, during braking is held to a given ratio, e.g. 85% to 80% of the vehicle speed. Therefore, the slip rate R has to be maintained below a given ratio, i.e., 15% to 10%. In the preferred embodiment, the control system controls the braking force so as to maintain the slip rate at about 15%. Therefore, a reference value $R_{ref}$ to be compared with the slip rate R is determined at a value at 85% of the projected speed $V_v$. As will be appreciated, the reference value is thus indicative of a slip rate threshold, which will be hereafter referred to "slip rate threshold $R_{ref}$" throughout the specification and claims, and varies according to variation of the target wheel speed.

Figure 4:
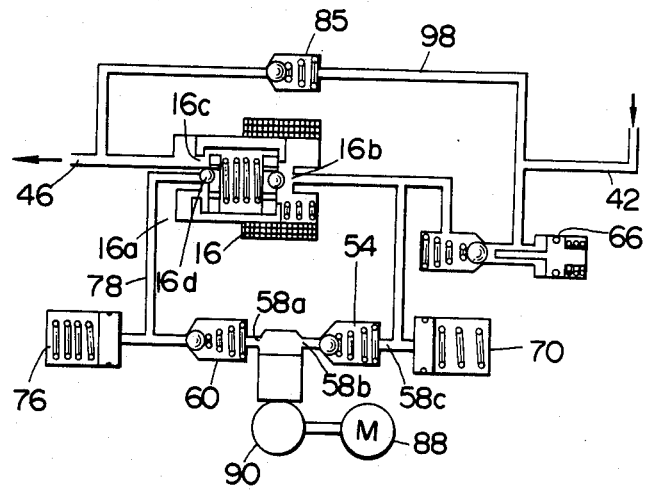
FIG. 4 is an illustration of the operation of an electromagnetic flow control valve employed in the hydraulic circuit, which valve has been shown in an application mode for increasing the fluid pressure in a wheel cylinder.
Figure 5:
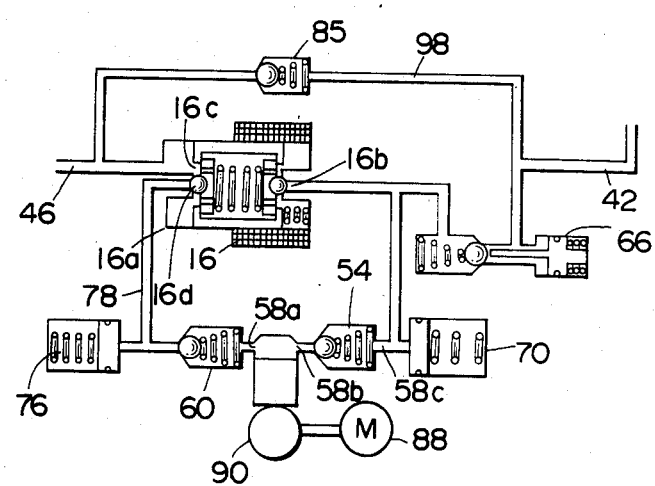
FIG. 5 is a view similar to FIG. 4 but of the valve in a hold mode in which the fluid pressure in the wheel cylinder is held at a substantially constant value.
Figure 6:
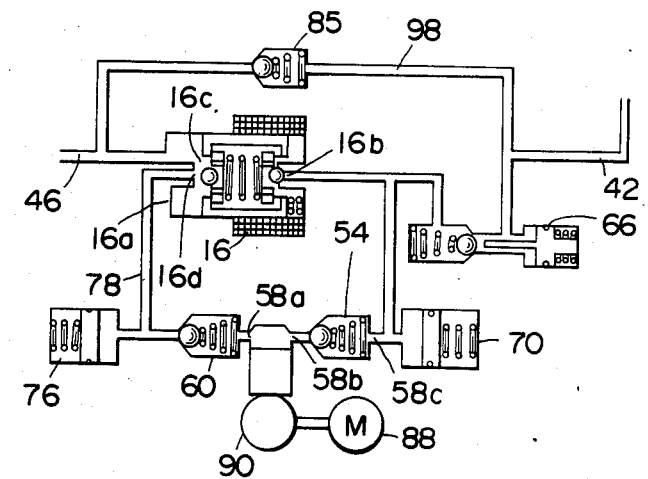
FIG. 6 is a view similar to FIG. 4 but of the valve in a release mode in which the fluid pressure in the wheel cylinder is reduced.

In practical brake control operation performed by the preferred embodiment of the anti-skid control system according to the present invention, the electric current applied to the actuator attains a limited value, e.g., 2A to place the electromagnetic valve 30a in the hold mode as shown in FIG. 5 when the wheel speed remains inbetween the target wheel speed $V_i$ and the slip rate threshold $R_{ref}$. When the slip rate derived from the target wheel speed $V_i$ and the wheel speed $V_w$ becomes equal to or larger than the slip rate threshold $R_{ref}$, then the supply current to the actuator 16 is increased to a maximum value, e.g. 5A to place the electromagnetic valve in the release mode as shown in FIG. 6. By maintaining the release mode, the wheel speed $V_w$ is recovered to the target wheel speed. When the wheel speed is thus recovered or resumed so that the slip rate R at that wheel speed becomes equal to or less than the slip rate threshold $R_{ref}$, then the supply current to the actuator 16 is dropped to the limited value, e.g. 2A to return the electromagnetic valve 30a to the hold mode. By holding the reduced fluid pressure in the wheel cylinder, the wheel speed $V_w$ is further resumed to the target wheel speed $V_i$. When the wheel speed $V_w$ is resumed equal to or higher than the target wheel speed $V_i$, the supply current is further dropped to zero for placing the electromagnetic valve in the application mode as shown in FIG. 4. The electromagnetic valve 30a is maintained in the application mode until the wheel speed is decelerated at a wheel speed at which the wheel deceleration becomes equal to or slightly more than the deceleration threshold $R_{ref} - 1.2G$. At the same time, the projected speed $V_v$ is again derived with respect to the wheel speed at which the wheel deceleration $a_w$ becomes equal to or slightly larger than the deceleration threshold $a_{ref}$. From a difference of speed of the last projected speed and the instant projected speed and the period of time from a time obtaining the last projected speed to a time obtaining the instant projected speed, a deceleration rate of the target wheel speed $V_i$ is derived. Therefore, assuming the last projected speed is $V_{v1}$, the instant projected speed is $V_{v2}$, and the period of time is $T_v$, the target wheel speed $V_i$ can be obtained from the following equation:

$$V_i = V_{v2} - (V_{v1} - V_{v2})/T_v \times t_e$$

where $t_e$ is an elapsed time from the time at which the instant projected speed $V_{v2}$ is obtained.

Based on the input timing to $t_1$, $t_2$, $t_3$, $t_4$ ..., deceleration rate $a_w$ is derived from the foregoing equation (1). In addition, the projected speed $V_v$ is estimated as a function of the wheel speed $V_w$ and rate of change thereof. Based on the instantaneous wheel speeds $V_{w1}$ at which the wheel deceleration is equal to or less than the deceleration threshold $a_{ref}$ and the predetermined fixed value, e.g. 0.4G for the first skid cycle of control operation, the target wheel speed $V_i$ is calculated. According to equation (2), the slip rate R is calculated, using successive wheel speed values $V_{w1}$, $V_{w2}$, $V_{w3}$ ... as parameters. The derived slip rate R is compared with the slip rate threshold $R_{ref}$. As the wheel speed $V_w$ drops below the projected speed $V_v$ at the time $t_1$, the controller unit 202 switches the control mode from the application mode to the hold mode. Assuming also that the slip rate R exceeds the slip rate threshold at the time $t_4$, then the controller unit 202 switches the control mode to the release mode to release the fluid pressure at the wheel cylinder.

Upon release of the brake pressure in the wheel cylinder, the wheel speed $V_w$ recovers, i.e. the slip rate R drops until it is smaller than the slip rate threshold at time $t_7$. The controller unit 202 detects when the slip rate R is smaller than the slip rate threshold $R_{ref}$ and switches the control mode from release mode to the hold mode.

By maintaining the brake system in the hold mode in which reduced brake pressure is applied to the wheel cylinder, the wheel speed increases until it reaches the projected speed as indicated by the intersection of the dashed line ($V_v$) and the solid trace in the graph of $V_w$ in FIG. 11. When the wheel speed $V_w$ becomes equal to the target wheel speed $V_i$ (at a time $t_8$), the controller unit 202 switches the control mode from the hold mode to the application mode.

As can be appreciated from the foregoing description, the control mode will tend to cycle through the control mode in the order application mode, hold mode, release mode and hold mode, as exemplified in the period of time from $t_1$ to $t_8$. This cycle of variation of the control modes will be referred to hereafter as "skid cycle". Practically speaking, there will of course be some hunting and other minor deviations from the standard skid cycle.

The projected speed $V_v$, which is meant to represent ideal vehicle speed behavior, at time $t_1$ can be obtained directly from the wheel speed $V_w$ at that time since zero slip is assumed. At the same time, the deceleration rate of the vehicle will be assumed to be a predetermined fixed value or the appropriate one of a family thereof, in order to enable calculation of the target wheel speed for the first skid cycle operation. Specifically, in the shown example, the projected speed $V_v$ at the time $t_1$ will be derived from the wheel speed $V_{w1}$ at that time. Using the predetermined deceleration rate, the projected speed will be calculated at each time the wheel deceleration $a_w$ in the application mode reaches the deceleration threshold $a_{ref}$.

At time $t_9$, the wheel deceleration $a_w$ becomes equal to or slightly larger than the deceleration threshold $a_{ref}$, then the second projected speed $V_{v2}$ is obtained at a value equal to the instantaneous wheel speed $V_w$ at the time $t_9$. According to the abovementioned equation, the deceleration rate da can be obtained $$da = (V_{v1} - V_{v2})/(t_9 - t_1)$$

Based on the derived deceleration rate da, the target wheel speed $V_i'$ for the second skid cycle of control operation is derived by:

$$V_i' = V_{v2} - da \times t_e$$

Based on the derived target wheel speed, the slip rate threshold $R_{ref}$ for the second cycle of control operation is also derived. As will be appreciated from FIG. 11, the control mode will be varied during the second cycle of skid control operation, to hold mode at time $t_9$ at which the wheel deceleration reaches the deceleration threshold $a_{ref}$ as set forth above, to release mode at time $t_{10}$ at which the slip rate R reaches the slip rate threshold $R_{ref}$, to hold mode at time $t_{11}$ at which the slip rate R is recovered to the slip rate threshold $R_{ref}$, and to application mode at time $t_{12}$ at which the wheel speed $V_w$ recovered or resumed to the target wheel speed $V_i'$. Further, it should be appreciated that in the subsequent cycles of the skid control operations, the control of the operational mode of the electromagnetic valve as set forth with respect to the second cycle of control operation, will be repeated.

Relating the above control operations to the structure of FIGS. 3 through 6, when application mode is used, no electrical current is applied to the actuator of the electromagnetic valve 16a so that the inlet port 16b communicates with the outlet port 16c, allowing fluid flow between the pressure passage 42 and the brake pressure line 46. A limited amount of electrical current (e.g. 2 A) is applied at times $t_1$, $t_7$, $t_9$ and $t_{11}$, so as to actuate the electromagnetic valve 16a to its limited stroke position by means of the actuator 16, and the maximum current is applied to the actuator as long as the wheel speed $V_w$ is not less than the projected speed and the slip rate is greater than the slip rate threshold $R_{ref}$. Therefore, in the shown example, the control mode is switched from the application mode to the hold mode at time $t_1$ and then to the release mode at time $t_4$. At time $t_7$, the slip rate increases back up to the slip rate threshold $R_{ref}$, so that the control mode returns to the hold mode, the actuator driving the electromagnetic valve 16a to its central holding position with the limited amount of electrical current as the control signal. When the wheel speed $V_w$ finally returns to the level of the target wheel speed $V_i$ at time $t_8$, the actuator 16 supply current is cut off so that the electromagnetic valve 16a returns to its rest position in order to establish fluid communication between the pressure line 42 and the braking pressure line 46 via inlet and outlet ports 16b and 16c.

Figure 12:
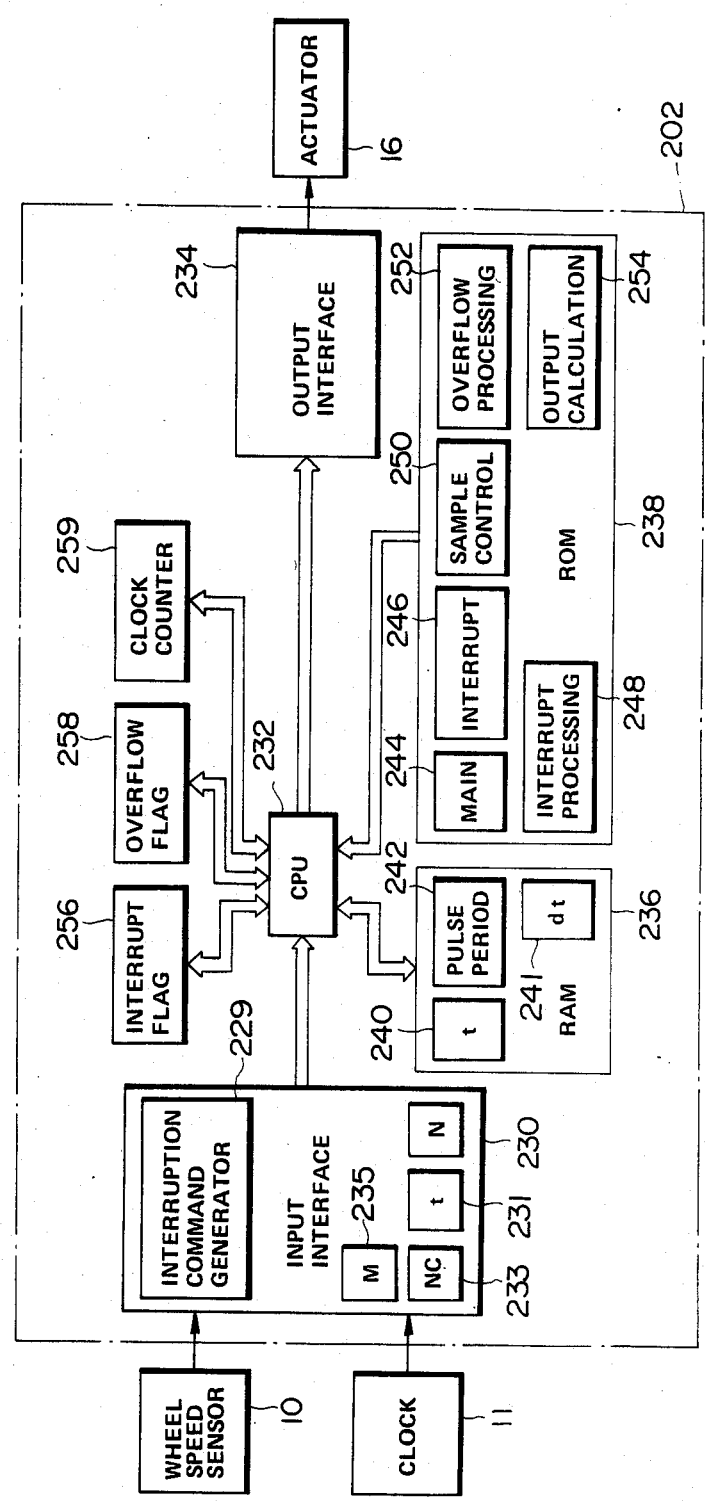
FIG. 12 is a block diagram of the preferred embodiment of a controller unit in the anti-skid brake control system according to the present invention.

Referring to FIG. 12, the controller unit 202 includes an input interface 230, CPU 232, an output interface 234, RAM 236 and ROM 238. The input interface 230 includes an interrupt command generator 229 which produces an interrupt command in resonse to every sensor pulse. In ROM, a plurality of programs including a main program (FIG. 13), an interrupt program (FIG. 15), an sample control program (FIG. 19), a timer overflow program (FIG. 20) and an output calculation program (FIG. 23) are stored in respectively corresponding address blocks 244, 246, 250, 252 and 254.

The input interface also has a temporary register for temporarily holding input timing for the sensor pulses. RAM 236 similarly has a memory block holding input timing for the sensor pulses. The contents of the memory block 240 of RAM may be shifted whenever calculations of the pulse interval, wheel speed, wheel acceleration or deceleration, target wheel speed, slip rate and so forth are completed. One method of shifting the contents is known from the corresponding disclosure of the U.S. Pat. No. 4,408,290. The disclosure of U.S. Pat. No. 4,408,290 is hereby incorporated by reference. RAM also has a memory block 242 for holding pulse intervals of the input sensor pulses. The memory block 242 is also adapted to shift the contents thereof according to the manner similar to set forth in the U.S. Pat. No. 4,408,290.

An interrupt flag 256 is provided in the controller unit 202 for signalling interrupt requests to the CPU. The interrupt flag 256 is set in response to the interrupt command from the interrupt command generator 229. A timer overflow interrupt flag 258 is adapted to set an overflow flag when the measured interval between any pair of monitored sensor pulses exceeds the capacity of a clock counter.

In order to time the arrival of the sensor pulses, a clock is connected to the controller unit 202 to feed time signals indicative of elapsed real time. The timer signal value is latched whenever a sensor pulse is received and stored in either or both of the temporary register 231 in the input interface 230 and the memory block 240 of RAM 236.

The operation of the controller unit 202 and the function of each elements mentioned above will be described with reference to FIGS. 13 to 30.

Figure 13:
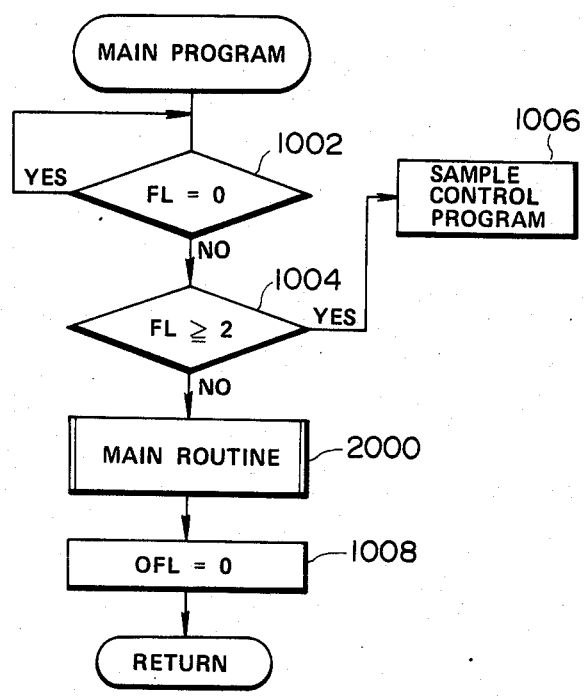
FIG. 13 is a flowchart of a main program of a microcomputer constituting the controller unit of FIG. 12.

FIG. 13 illustrates the main program for the anti-skid control system. Practically speaking, this program will generally be executed as a background job, i.e. it will have a lower priority than most other programs under the control of the same processor. Its first step 1002 is to wait until at least one sample period, covering a single sensor pulse or a group thereof, as described in more detail below, is completed as indicated when a sample flag FL has a non-zero value. In subsequent step 1004, the sample flag FL is checked for a value greater than one, which would indicate the sample period is too short. If this is the case, control passes to a sample control program labelled "1006" in FIG. 13 but shown in more detail in FIG. 19. If FL=1, then the control process is according to plan, and control passes to a main routine explained later with reference to FIG. 15. Finally, after completion of the main routine, a time overflow flag OFL is reset to signify successful completion of another sample processing cycle, and the main program ends.

Figure 14:
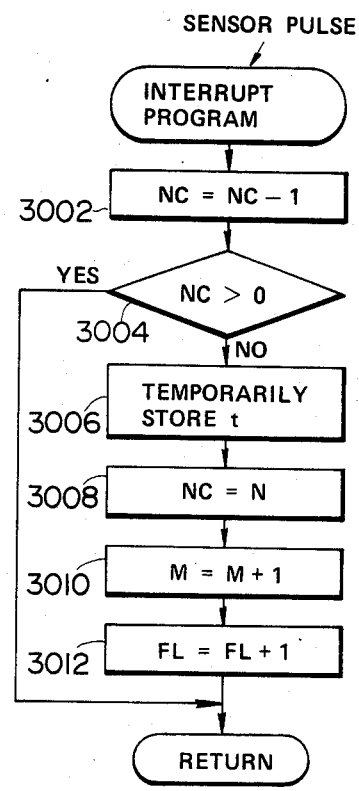
FIG. 14 is a flowchart of an interrupt program executed by the controller unit.

FIG. 14 shows the interrupt program stored in the memory block 246 of ROM 238 and executed in response to the interrupt command generated by the interrupt command generator 229 whenever a sensor pulse is received. It should be noted that a counter value NC of an auxiliary counter 233 is initially set to 1, a register N representing the frequency divider ratio is set at 1, and a counter value M of an auxiliary counter 235 is set at −1. After starting execution of the interrupt program, the counter value NC of the auxiliary counter 233 is decremented by 1 at a block 3002. The auxiliary counter value NC is then checked at a block 3004 for a value greater than zero. For the first sensor pulse, since the counter value NC is decremented by 1 (1−1=0) at the block 3002 and thus is zero, the answer of the block 3004 is NO. In this case, the clock counter value t is latched in a temporary register 231 in the input interference 230 at a block 3006. The counter value NC of the auxiliary counter 233 is thereafter assigned the value N in a register 235, which register value N is representative of frequency dividing ratio determined during execution of the main routine explained later, at a block 3008. The value M of an auxiliary counter 235 is then incremented by 1. The counter value M of the auxiliary counter 235 labels each of a sequence of sample periods covering an increasing number of sensor pulses. After this, the sample flag FL is incremented by 1 at a block 3012. After the block 3012, interrupt program ends, returning control to the main program or back to block 3002, whichever comes first.

On the other hand, when the counter value NC is non-zero when checked at the block 3004, this indicates that not all of the pulses for this sample period have been received, and so the interrupt program ends immediately.

This interrupt routine thus serves to monitor the input timing t of each pulse sampling period, i.e. the time t required to receive NC pulses, and signals completion of each sample period (M=0 through M=10, for example) for the information of the main program.

Before describing the operation in the main routine, the general method of grouping the sensor pulses into sample periods will be explained to facilitate understanding of the description of the operation in the main routine.

In order to enable the controller unit 202 to accurately calculate the wheel acceleration and deceleration $a_w$, it is necessary that the difference between the pulse intervals of the single or grouped sensor pulses exceeding a given period of time, e.g. 4 ms. In order to obtain the pulse interval difference exceeding the given period of time, 4 ms, which given period of time will be hereafter referred to as "pulse interval threshold S", some sensor pulses are ignored so that the recorded input timing t of the sensor pulse groups can satisfy the following formula:

$$dT = (C-B) - (B-A) \geq S(4 \text{ ms.}) \quad (3)$$

where A, B and C are the input times of three successive sensor pulse groups.

Figure 16:
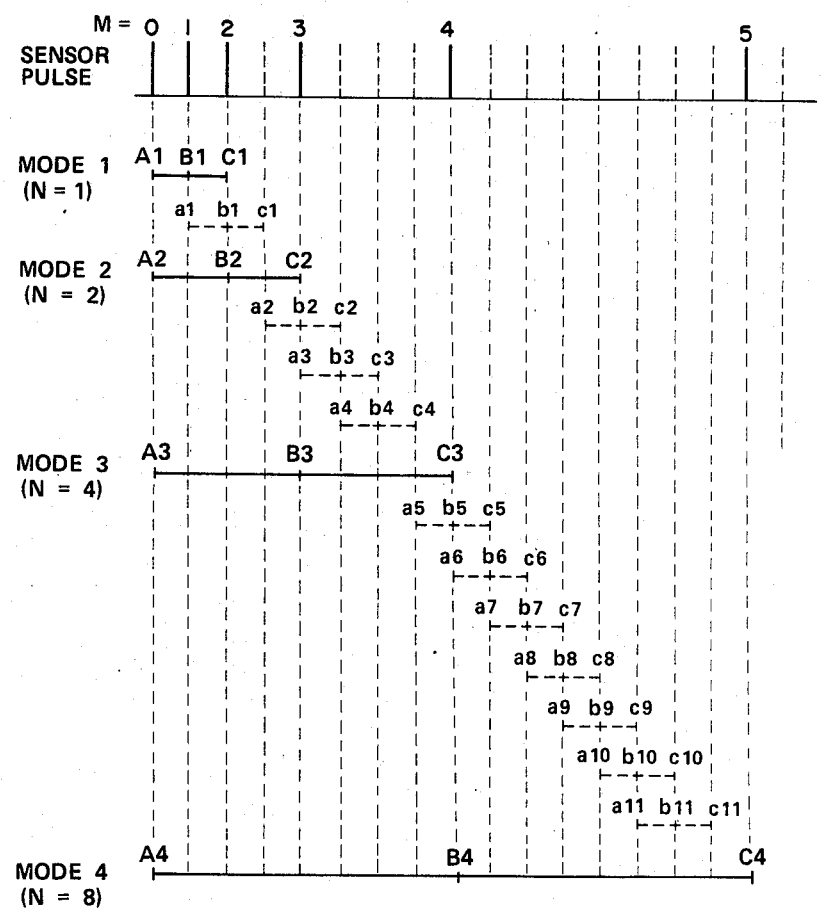
FIG. 16 is an explanatory diagram of the input timing sampling modes and variations thereof.

The controller unit 202 has different sample modes, i.e. MODE 1, MODE 2, MODE 3 and MODE 4 determining the number of sensor pulses in each sample period group. As shown in FIG. 16, in MODE 1 every sensor pulse input time is recorded and therefore the register value N is 1. In MODE 2, every other sensor pulse is ignored and the register value N is 2. In MODE 3, every fourth sensor pulse is monitored, i.e. its input time is recorded, and the register value N is 4. In MODE 4, every eighth sensor pulse is sampled and the register value N is then 8.

The controller unit 202 thus samples the input timing of three successive sensor pulses to calculate the pulse interval difference dT while operating in MODE 1. If the derived pulse interval difference is equal to or greater than the pulse interval threshold S, then sensor pulses will continue to be sampled in MODE 1. Otherwise, the input timing of every other sensor pulse is sampled in MODE 2 and from the sampled input timing of the next three sensor pulses sampled, the pulse interval difference dT is calculated to again be compared with the pulse interval threshold S. If the derived pulse interval difference is equal to or greater than the pulse interval threshold S, we remain in MODE 2. Otherwise, every four sensor pulses are sampled in MODE 3. The input timings of the next three sampled sensor pulses are processed to derive the pulse interval difference dT. The derived pulse interval difference dT is again compared with the pulse interval threshold S. If the derived pulse interval difference is equal to or greater than the pulse interval threshold S, the MODE remains at 3 and the value N is set to 4. On the other hand, if the derived pulse interval difference dT is less than the pulse interval threshold S, the mode is shifted to MODE 4 to sample the input timing of every eighth sensor pulse. In this MODE 4, the value N is set at 8.

For instance, in FIG. 16, the sensor pulses $A_1$, $B_1$ and $C_1$ are sampled under MODE 1. In MODE 2, the sensor pulses $a_1$ and $c_1$ are ignored and the sensor pulses $A_1$ ($=A_2$), $B_2$ ($=b_1$) and $C_2$ ($=b_2=a_3$) are sampled. In MODE 3, the three sensor pulses $c_2$ ($=b_3=a_4$), $c_3$ ($=b_4$) and $c_4$ following $B_3$ ($=c_2$) are ignored and the sensor pulses $A_3$ ($=A_1=A_2$), $B_3$ ($=b_2=a_3$) and $C_3$ ($=b_5=a_6$) are sampled. In MODE 4, the seven sensor pulses $c_5$ ($=b_6=a_7$), $c_6$ ($=b_7=a_8$), $c_7$ ($=b_8=a_9$), $c_8$ ($=b_9=a_{10}$), $c_9$ ($=b_{10}=a_{11}$), $c_{10}$ ($=b_{11}$) and $c_{11}$ following $B_4$ ($=c_3$) are ignored and the sensor pulses $A_4$ ($=A_1=A_2=A_3$), $B_4$ ($=C_3=b_5=a_6$) and $C_4$ are sampled.

Figure 15:
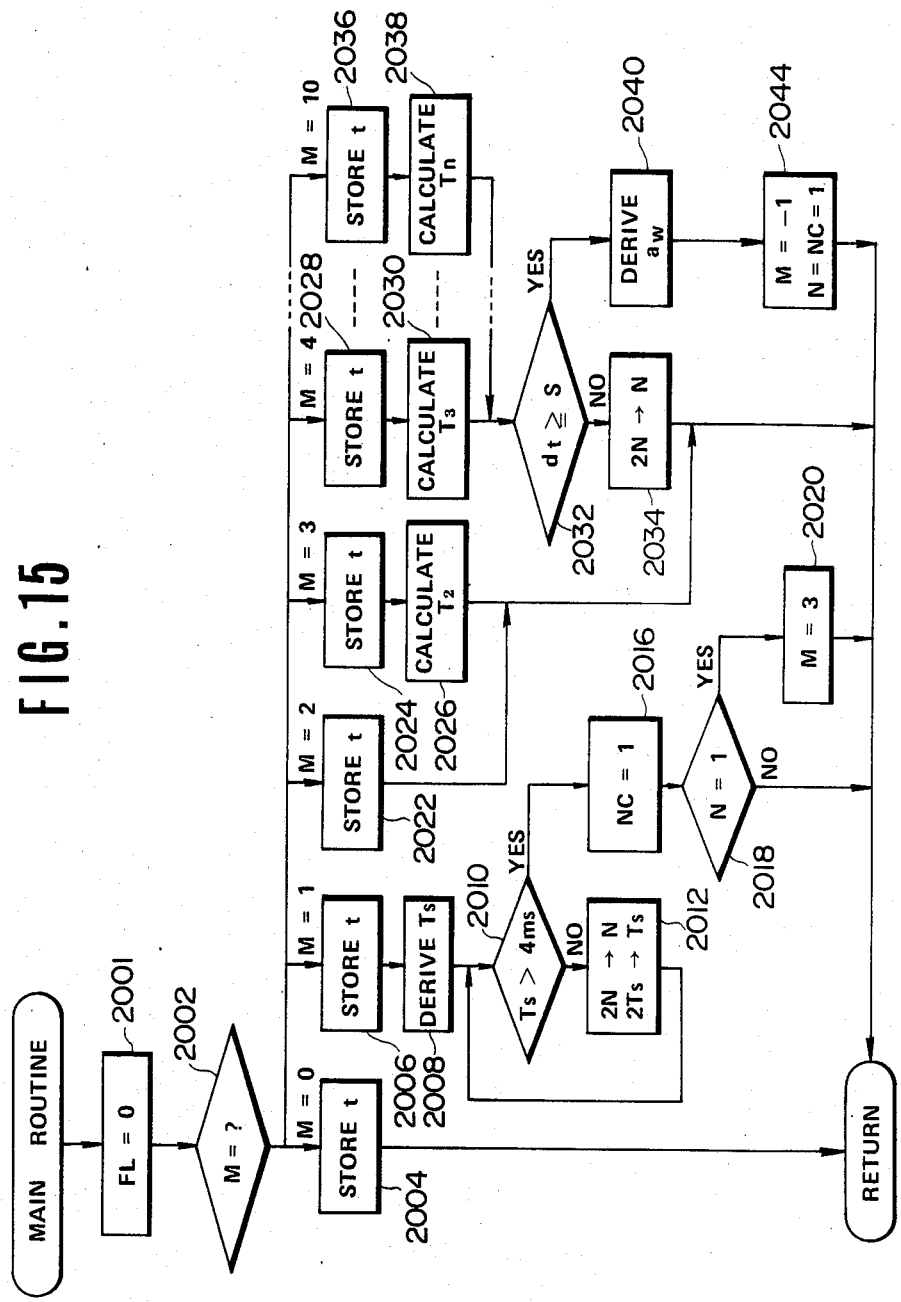
FIG. 15 is a flowchart of a main routine in the main program of FIG. 13.

Referring to FIG. 15, the main routine serves to periodically derive an updated wheel acceleration rate value $a_w$. In general, this is done by sampling larger and larger groups of pulses until the difference between the durations of the groups is large enough to yield an accurate value. In the main routine, the sample flag FL is reset to zero at a block 2001. Then the counter value M of the auxiliary counter 233, indicating the current sample period of the current $a_w$ calculation cycle, is read out at a block 2002 to dictate the subsequent program steps.

Specifically, after the first sample period (M=∅), the input timing t temporarily stored in the temporary register 231 corresponding to the sensor pulse number (M=0) is read out and transferred to a memory block 240 of RAM at a block 2004, which memory block 240 will be hereafter referred to as "input timing memory". Then control passes to the block 1008 of the main program. When M=2, the corresponding input timing t is read out from the temporary register 231 and transferred to the input timing memory 240 at a block 2006.

Then, at a block 2008, a pulse interval Ts between the sensor pulses of M=1 is derived from the two input timing values in the input timing memory 240. That is, the pulse interval of the sensor pulse (M=1) is derived by:

$$Ts = t_1 - t_0$$

where
$t_1$ is input time of the sensor pulse M1; and
$t_0$ is input time of the sensor pulse M0.

The derived pulse interval $T_s$ of the sensor pulse M1 is then compared with a reference value, e.g. 4 ms., at a block 2010. If the pulse interval $T_s$ is shorter than the reference value, 4 ms., control passes to a block 2012 wherein the value N and the pulse interval $T_s$ are multiplied by 2. The double timing value ($2T_s$) is again compared with the reference value by returning to the block 2010. The blocks 2010 and 2012 constitute a loop which is repeated until the pulse interval ($2nT_s$) exceeds the reference value. When the pulse interval ($2nT_s$) exceeds the reference value at the block 2010, a corresponding value of N (2N) is automatically selected. This N value represents the number of pulses to be treated as a single pulse with regard to timing.

After setting the value of N and thus deriving the sensor pulse group size then the auxiliary counter value NC is set to 1, at a block 2016. The register value N is then checked for a value of 1, at a block 2018. If N=1, then the auxiliary counter value M is set to 3 at a block 2020 and otherwise control returns to the main program. When the register value N equals 1, the next sensor pulse, which would normally be ignored, will instead be treated as the sensor pulse having the sample period number M=3.

In the processing path for the sample period number M=3, the corresponding input timing is read from the corresponding address of the temporary register 231 and transferred to the input timing memory 240, at a block 2024. The pulse interval $T_2$ between the sensor pulses at M=1 and M=3 is then calculated at a block 2026. The derived pulse interval $T_2$ is written in a storage section of a memory block 242 of RAM 236 for a current pulse interval data, which storage section will be hereafter referred at as "first pulse interval storage" and which memory block 242 will be hereafter referred to as "pulse interval memory". After the block 2026, control returns to the main program to await the next sensor pulse, i.e. the sensor pulse for sample period number M=4.

When the sensor pulse for M=4 is received, the value t of the temporary register 231 is read out and transferred to the input timing memory 240 at block 2028. Based on the input timing of the sensor pulses for M=3 and M=4, the pulse interval $T_3$ is calculated at a block 2030. The pulse interval $T_3$ derived at the block 2030 is then written into the first pulse interval storage of the pulse interval memory. At the same time, the pulse interval data $T_2$ previously stored in the first pulse interval storage is transferred to another storage section of the pulse interval memory adapted to store previous pulse interval data. This other storage section will be hereafter referred to as "second pulse interval storage". Subsequently, at a block 2032 the contents of the first and second storages, i.e. the pulse interval data $T_2$ and $T_3$ are read out. Based on the read out pulse interval data $T_2$ and $T_3$, a pulse interval difference dT is calculated at block 2032 and compared with the pulse interval threshold S to determine whether or not the pulse interval difference dT is large enough for accurate calculation of wheel acceleration or deceleration $a_w$. If so, process goes to the block 2040 to calculate the wheel acceleration or deceleration according to the equation (1). The register value N is then set to 1 at the block 2044 and thus MODE 1 is selected. In addition sample period number M is reset to −1, and the $a_w$ derivation cycle starts again. On the other hand, if at the block 2032 the pulse interval difference dT is too small to calculate the wheel acceleration or deceleration $a_w$, then the value N is multiplied by 2 at a block 2034. Due to the updating of the value N, the sample mode of the sensor pulses is shifted to the next mode.

When the block 2034 is performed and thus the sample mode is shifted to MODE 2 with respect to the sensor pulse of M=4', the sensor pulse $c_2$ input following to the sensor pulse of M=4' is ignored. The sensor pulse $c_3$ following to the ignored sensor pulse $c_2$ is then taken as the sensor pulse to be sampled as M=3". At this time, the sensor pulse of M=4' is treated as the sensor pulse of M=2" and the sensor pulse of M=2 is treated as the sensor pulse of M=1". Therefore, calculation of the interval difference dT and discrimination if the derived interval difference dT is greater than the pulse interval threshold S in the block 2032 will be carried out with respect to the sensor pulse $c_3$ which will be treated as the sensor pulse of M=4". The blocks 2032 and 2034 are repeated until the interval difference greater than the pulse interval threshold S is obtained. The procedure taken in each cycle of repetition of the blocks 2032 and 2034 is substantially same as that set forth above.

As set forth above, by setting the counter value NC of the auxiliary counter 233 to 1 at the block 2016, the input timing of the sensor pulse received immediately after initially deriving the sample mode at the blocks 2010 and 2012 will be sampled as the first input timing to be used for calculation of the wheel acceleration and deceleration. This may be contrasted with the procedure taken in the known art.

Figure 18:
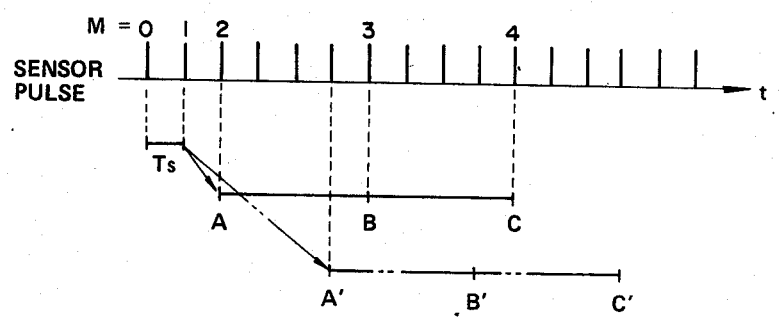
FIG. 18 is a diagram of the period of time during which sensor pulses are sampled in accordance with the present invention, which period of time is compared with that used in the typical prior art.

FIG. 18 shows timing of calculation of the wheel acceleration and deceleration in comparison with the calculation timing of the wheel acceleration and deceleration in the prior art. As will be appreciated from FIG. 18, in the prior art, after deriving the sample mode so that the pulse interval $T_s$ is longer than the reference value, e.g. 4 ms, the first sensor pulse A' is sampled after thinning the corresponding number of sensor pulses e.g. 3 sensor pulses in the shown case. On the other hand, the first sensor pulse A, according to the present invention, can be sampled with respect to the sensor pulse input immediately after deriving the sample mode. As will be appreciated herefrom, sample timing according to the present invention is faster than that in the prior art so that calculation of the wheel acceleration and deceleration can be performed at an earlier timing than that in the conventional art. In other words, the time lag of wheel acceleration/deceleration calculation due to sensor pulse grouping can be shortened.

Figure 17:
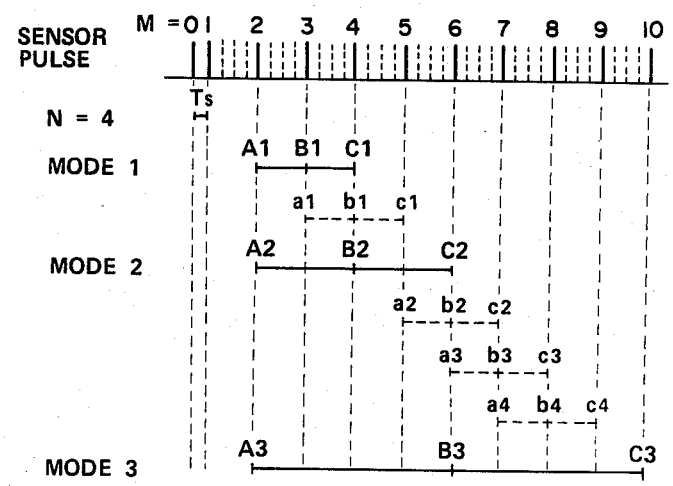
FIG. 17 is another explanatory diagram of the sampling timing of the sensor pulse input timing.

FIG. 17 shows a modified procedure can be taken for obtaining the interval difference dT larger than the pulse interval threshold S. In this modification, SUB-MODE as illustrated is used instead of performing the block 2034 to shift the sample mode of FIG. 16.

In this modification, when MODE 3 is selected during execution of the main routine of FIG. 15, at the blocks 2010, 2012 and 2016, the controller unit 202 is operating under MODE 3, first the sensor pulses $A_1$, $B_1$ and $C_1$ are sampled as shown in FIG. 17. The pulse interval difference between $(C_1-B_1)$ and $(B_1-A_1)$ is calculated in response to the sensor pulse $C_1$ (M=4). This operation for detecting the interval difference dT larger than the pulse interval threshold S is substantially corresponding to the operation at the blocks 2032, in the main routine of FIG. 15. If the determined pulse interval difference dT is equal to or greater than the pulse interval threshold S, the wheel acceleration or deceleration will be calculated using the derived pulse interval difference dT (SUB-MODE 1) at the block 2040 of the main routine of FIG. 15. On the other hand, if the derived pulse interval difference dT is less than the pulse interval threshold S, the sensor pulses $A_2$ (=$A_1$:M=2), $B_2$ (=$C_1$:M=4) and $C_2$ (M=6) are sampled in SUB-MODE 2. If the pulse interval difference derived from the input timing of $A_2$, $B_2$ and $C_2$ is less than the pulse interval threshold S, then the controller unit 202 shifts the operation mode into SUB-MODE 3 in which the sensor pulses $A_3$ (=$A_2$=$A_2$:M=2), $B_3$ (=$C_2$:M=6) and $C_3$ (M=10) are sampled.

In both of SUB-MODEs 2 and 3, calculation for deriving the wheel acceleration or deceleration $a_w$ relative to the sensor pulses M5, M6, M7, M8 and M9 are performed with taking the input timing of two proceeding sensor pulses similarly to the procedure performed at SUB-MODE 1 when the interval difference dT larger than the pulse interval threshold S can be detected with respect to M7, M8 or M9, for example.

As will be appreciated herefrom, SUB-MODE referred to hereabove mean further variations of the sensor pulse sample mode in order to obtain the interval difference dT greater than the pulse interval threshold S for enabling calculation of the wheel acceleration and deceleration at the block 2040 of the main routine of FIG. 15. With the foregoing modification of FIG. 17, even when the interval difference dT greater than the pulse interval threshold S is obtained with respect to the sensor pulse which has to be thinned under the procedure of FIG. 16, the wheel acceleration and deceleration can be derived for reducing loss time. Further, according to this modified procedure, the calculation timing of the wheel acceleration and deceleration can follow relatively abrupt change of the wheel speed.

FIG. 19 shows the sample control program stored in the memory block 250 of ROM 238. This sample control program is executed when the sample flag FL reaches a predetermined value. In the embodiment shown, the sample control program is executed when the sample flag value FL equals 2. When the sample flag value FL=2 at the block 1004 in FIG. 13, then the sample control program is executed to multiply the auxiliary counter value N by 2, at a block 4002 of FIG. 19. At the same time, the auxiliary counter value NC is set to 1. Thereafter, the sample flag is reset to zero at a block 4004.

The sample control program of FIG. 19 provides a quick and simple adjustment of the sampling mode for both initial start-up and cases where the wheel accelerates so quickly that two sampling periods are completed within a single acceleration rate $a_w$ derivation cycle. Setting N equal to 2N in block 4002 doubles the sample size and so effectively doubles the sample period and setting NC to 1 ensures that the sampling will restart immediately with the next sensor pulse.

FIG. 20 shows the timer overflow program stored in the memory block 252 of ROM. As set forth above, the clock counter 259 used in the shown embodiment has the capacity to count the clock pulses from the clock generator 11 for 64 ms. Therefore, the timer overflow program is executed as an interrupt program whenever the counter value of the clock counter 259 reaches its maximum value (counter is full counted), i.e. every 64 ms. Upon starting execution of the timer overflow program, the timer overflow value OFL is incremented by 1, at a block 4010. The overflow value OFL is then checked at a block 4012. If the overflow value OFL is less than a given value, e.g. 2, then control returns to the main routine of the main program. Since the timer overflow value OFL is cleared at the end of the main program at the block 1008, if the timer overflow program is executed twice during one cycle of execution of main program, the overflow value OFL would become 2. In this case, the answer at the block 4012 would be YES and the wheel speed value $V_w$ would be set to zero and the wheel acceleration and deceleration value $a_w$ would also be set to zero.

Figure 21:
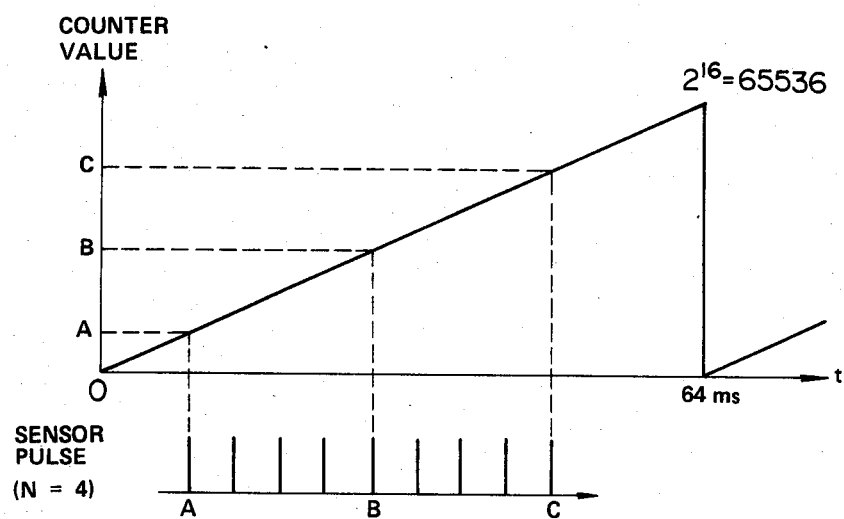
FIG. 21 is a graph of the variation of a counter value of a clock counter in the preferred embodiment of controller unit.
Figure 22:
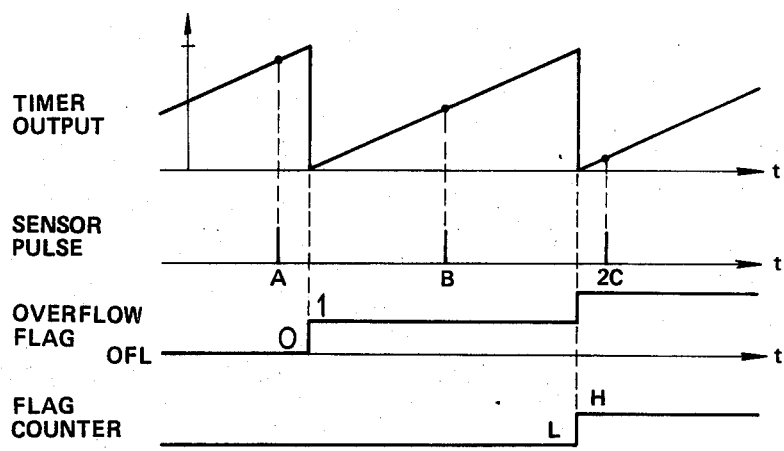
FIG. 22 is a timing chart of the timer overflow which is shown in relation to the value of the timer overflow interrupt flag.
Figure 24:
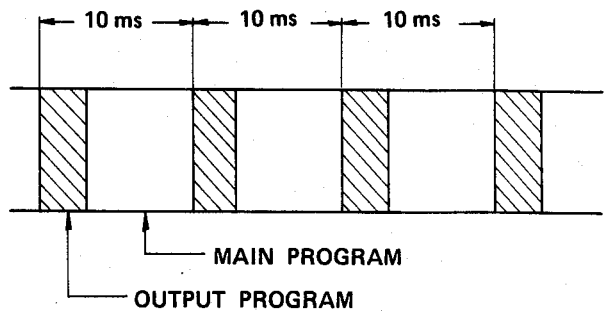
FIGS. 24 and 25 are diagrams of execution timing of the output calculation program in relation to the main program.
Figure 25:
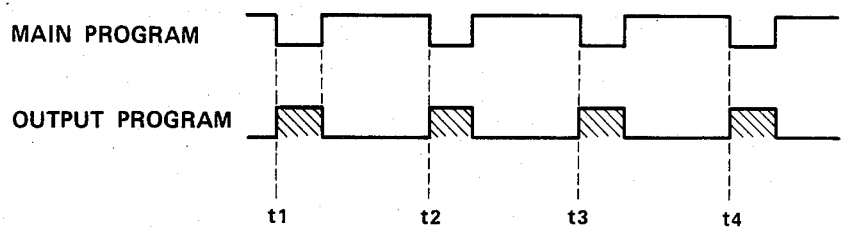

For instance, if three successive sensor pulses are produced within the period of time for which the clock counter 259 counts the clock pulses from the clock signal generator, as shown in FIG. 21, the input timing of respective sensor pulses may be as shown at A, B and C, corresponding to the counter values $C_A$, $C_B$ and $C_C$. The overflow value OFL remains at zero in response to each of the sensor pulses A, B and C, since the sensor pulses are received before the counter time elapses. Therefore, the first time the timer overflow program is executed after receiving the sensor pulse C, the timer overflow value is incremented by 1 during execution of the timer overflow program at the block 4010. In this case, the timer overflow value OFL is still only 1 which is smaller than the limit checked for at the block 4012. On the other hand, if the sensor pulses are produced at intervals relatively long so that the timer overflow program can be executed twice before three successive sensor pulses are sampled, as shown in FIG. 23, then the wheel is movely so slowly that wheel acceleration $a_w$ can not be reliably calculated.

Therefore, in the timer overflow program, as shown in FIG. 20, the wheel speed $V_w$ and the wheel acceleration or deceleration $a_w$ are set to zero at the block 4014. By setting both the wheel speed $V_w$ and the wheel acceleration and deceleration $a_w$ to zero, serious errors will be avoided.

FIG. 23 shows the output program for deriving the wheel speed $V_w$, wheel acceleration and deceleration $a_w$ and slip rate R, selecting the operational mode, i.e. application mode, hold mode and release mode and outputting an inlet signal EV and/or an outlet signal AV depending upon the selected operation mode of the actuator 16.

When the application mode is selected the inlet signal EV goes HIGH and the outlet signal EV goes HIGH. When the release mode is selected, the inlet signal EV goes LOW and the outlet signal AV also goes LOW. When the selected mode is hold mode, the inlet signal EV remains HIGH while the outlet signal AV goes LOW. These combinations of the inlet signal EV and the outlet signal AV correspond to the actuator supply current levels shown in FIG. 11 and thus actuate the electromagnetic valve to the corresponding positions illustrated in FIGS. 4, 5 and 6.

The output program is stored in the memory block 254 and adapted to be read out periodically, e.g. every 10 ms, to be executed as an interrupt program. The output calculation program is executed in the time regions shown in hatching in FIGS. 24 and 25.

During execution of the output calculation program, the pulse interval T is read out from a memory block 241 of RAM which stores the pulse interval, at a block 5002. As set forth above, since the pulse interval T is inversely proportional to the wheel rotation speed $V_w$, the wheel speed can be derived by calculating the reciprocal (1/T) of the pulse interval T. This calculation of the wheel speed $V_w$ is performed at a block 5004 in the output program. After the block 5004, the target wheel speed $V_i$ is calculated at a block 5006. The manner of deriving the target wheel speed $V_i$ has been illustrated in the U.S. Pat. Nos. 4,392,202 to Toshiro MATSUDA, issued on July 5, 1983, 4,384,330 also to Toshiro MATSUDA, issued May 17, 1983 and 4,430,714 also to Toshiro MATSUDA, issued on Feb. 7, 1984, which are all assigned to the assignee of the present invention. The disclosure of the above-identified three United States Patents are hereby incorporated by reference for the sake of disclosure. In addition, the method of deriving the wheel speed $V_w$ may be appreciated from FIG. 30. As is obvious herefrom, the target wheel speed $V_i$ is derived as a function of wheel speed deceleration as actually detected. For instance, the wheel speed $V_w$ at (a) of FIG. 30 at which the wheel deceleration $a_w$ exceeds the deceleration threshold $a_{ref}$, e.g. $-1.2$ G is taken as one reference point for deriving the target wheel speed $V_i$. The wheel speed at (b) of the current skid cycle, at which the wheel deceleration $a_w$ also exceeds the deceleration threshold $a_{ref}$, is taken as the other reference point. In addition, the period of time between the points a and b is measured. Based on the wheel speed $V_{w1}$ and $V_{w2}$ and the measured period P, the deceleration rate $dV_i$ is derived from:

$$dV_i = (V_{w1} - V_{w2})/P \qquad (4)$$

This target wheel speed $V_i$ is used for skid control in the next skid cycle.

It should be appreciated that in the first skid cycle, the target wheel speed $V_i$ cannot be obtained. Therefore, for the first skid cycle, a predetermined fixed value will be used as the target wheel speed $V_i$.

Figure 26:
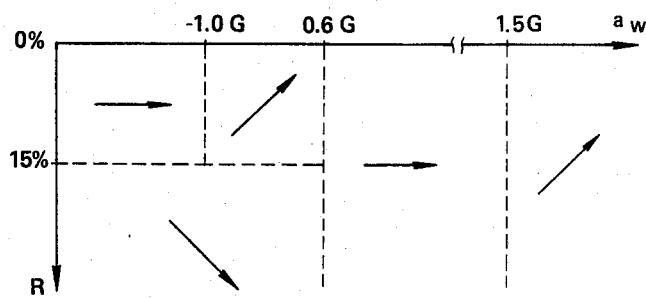
FIG. 26 is a table determining the operation mode of the actuator 16, which table is accessed in terms of the wheel acceleration and deceleration and the slip rate.

At a block 5008, (FIG. 23) the slip rate R is calculated according to the foregoing formula (2). Subsequently, the operational mode is determined on the basis of the wheel acceleration and deceleration $a_w$ and the slip rate R, at a block 5010. FIG. 26 shows a table used in determining or selecting the operational mode of the actuator 16 and which is accessed according to the wheel acceleration and deceleration $a_w$ and the slip rate R. As can be seen, when the wheel slip rate R is in the range of 0 to 15%, the hold mode is selected when the wheel acceleration and deceleration $a_w$ is lower than $-1.0$ G and the application mode is selected when the wheel acceleration and deceleration $a_w$ is in the range of $-1.0$ G to 0.6 G. On the other hand, when the slip rate R remains above 15%, the release mode is selected when the wheel acceleration and deceleration $a_w$ is equal to or less than 0.6 G, and the hold mode is selected when the wheel acceleration and deceleration is in a range of 0.6 G to 1.5 G. When the wheel acceleration and deceleration $a_w$ is equal to or greater than 1.5 G, the application mode is selected regardless of the slip rate.

According to the operational mode selected at the block 5010, the signal levels of the inlet signal EV and the outlet signal AV are determined so that the combination of the signal levels corresponds to the selected operation mode of the actuator 16. The determined combination of the inlet signal EV and the outlet signal AV are output to the actuator 16 to control the electromagnetic valve.

It should be appreciated that, although the execution timing of the output calculation program has been specified to be about 10 ms in the foregoing disclosure, the timing is not necessarily fixed to the mentioned timing and may be selectable from the approximate range of 1 ms to 20 ms. The execution timing of the output program is fundamentally to be determined in accordance with the response characteristics of the actuator.

Figure 27:
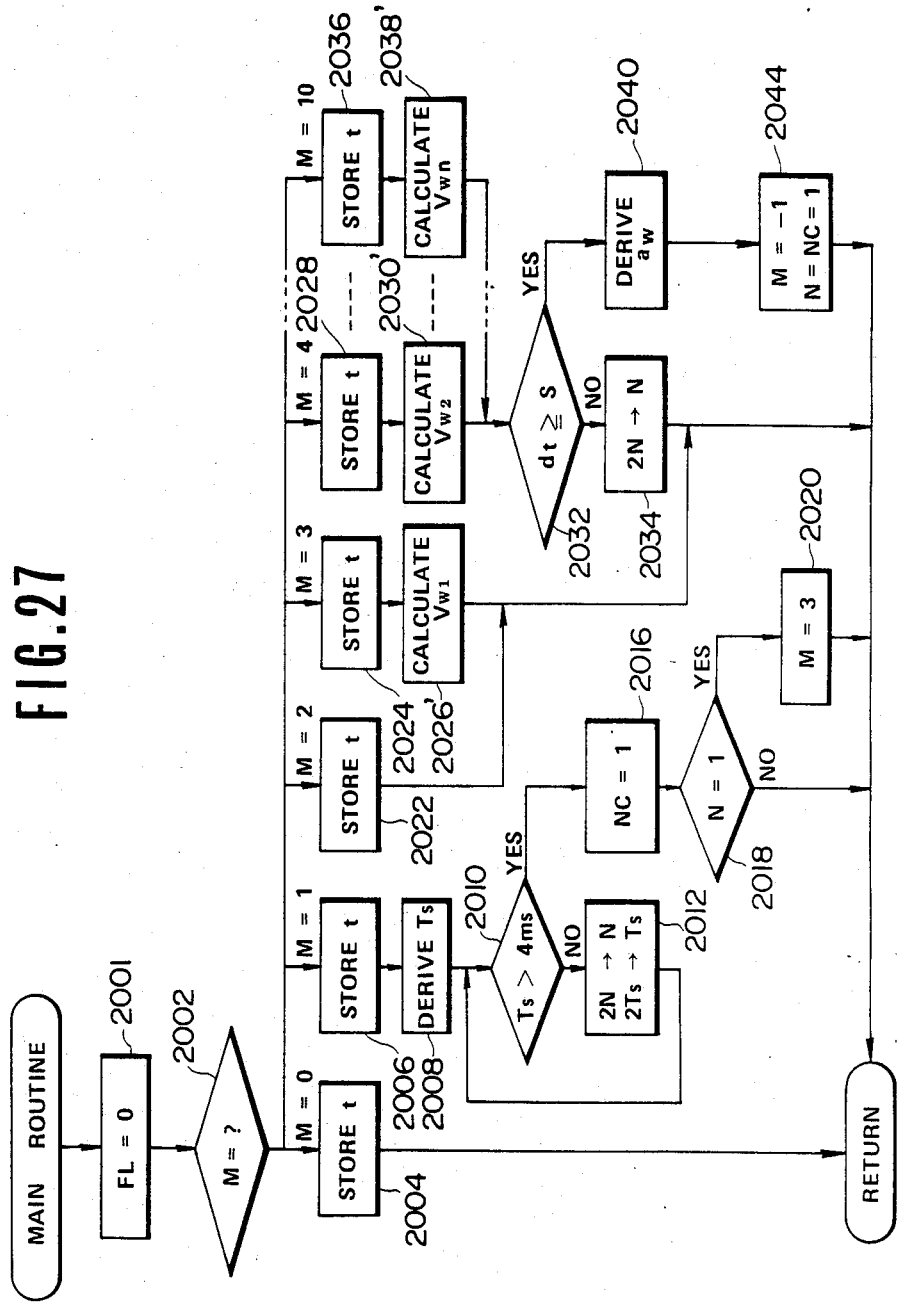
FIG. 27 is a flowchart of the main routine similar to FIG. 15, but modified according to a proposed modification.
Figure 28:
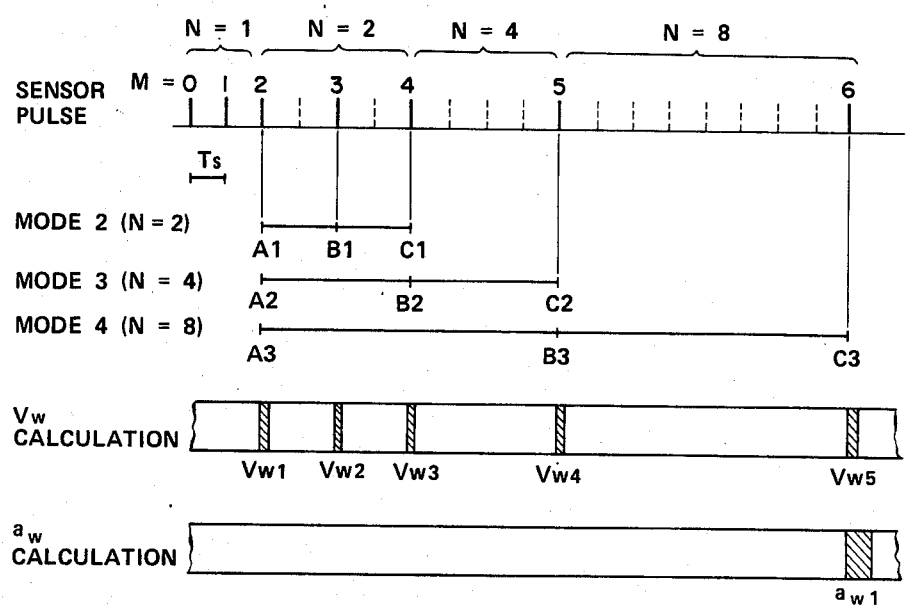
FIG. 28 shows the timing of calculations of the wheel speed and the wheel accelerations and deceleration carried out by the modified main routine of FIG. 27.
Figure 29:
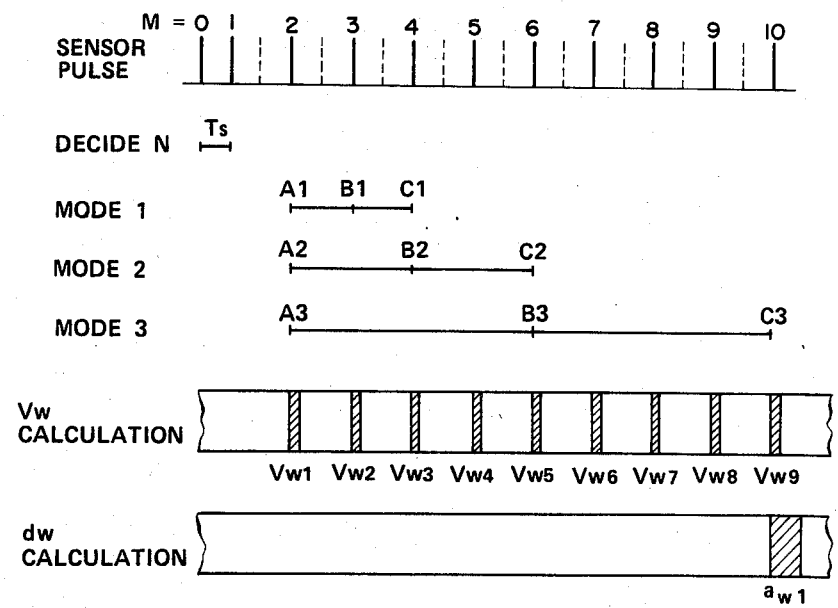
FIG. 29 is a timing chart of calculation similar to FIG. 28 but for a also modified form.

Although the pulse intervals have been described as being the values calculated at the blocks 2026, 2030 ... of the main routine of FIG. 15 in the foregoing embodiment, it would be possible to perform calculations for deriving the wheel speed $V_w$ at the corresponding blocks as shown by the blocks 2026' and 2030' of FIG. 27. In this case, the derived wheel speed $V_w$ may be stored in an appropriate address of RAM. According to flowchart of FIG. 27, the wheel speed $V_{w1}$ is calculated with respect to the sensor pulse $M=2$ and wheel speed $V_{w2}$ is calculated with respect to the sensor pulse $M=3$. Specifically, the wheel speed is calculated whenever the sensor pulse to be sampled is received, as shown in FIG. 28. In this modification, even if the pulse interval difference is not large enough to allow calculation of the wheel acceleration and deceleration at the sensor pulse $M=10$, the delay in deriving the control output, i.e. the combination of the inlet signal EV and the outlet signal AV will be minimized by calculating the wheel speed during execution of the main routine.

A modification is provided to the foregoing modification of FIG. 27 by neglecting the block 2034. In this case, the sampling mode for sampling the sensor pulse input timing is not changed after it is once decided at the block 2010 unless adjusted upon occasion at block 4002. Therefore, calculation of the wheel speed will be performed at the timing illustrated in FIG. 29.

FIG. 31 shows another embodiment of the controller unit 202 in the preferred embodiment of the anti-skid control system according to the present invention. In practice, the circuit shown in FIG. 31 performs the same procedure in controlling the actuator 16 and each block of the circuit performs operation substantially corresponding to that performed by the foregoing computer flowchart.

In FIG. 31, the wheel speed sensor 10 is connected to a shaping circuit 260 provided in the controller unit 202. The shaping circuit 260 produces the rectangular sensor pulses having a pulse interval inversely proportional to the wheel speed $V_w$. The sensor pulse output from the shaping circuit 260 is fed to a pulse pre-scaler 262 which counts the sensor pulses to produce a sample command for sampling input timing when the counter value reaches a predetermined value. The predetermined value to be compared with the counter value in the pulse pre-scaler 262 is determined such that the intervals between the pairs of three successive sample commands will be sufficiently different to allow calculation of the wheel acceleration and deceleration rate.

The sample command is fed to a flag generator 264. The flag generator 264 is responsive to the sample command to produce a flag signal. The flag signal of the flag generator 264 is fed to a flag counter 266 which is adapted to count the flag signals and output a counter signal having a value representative of its counter value.

At the same time, the sample command of the pulse pre-scaler 262 is fed to a latching circuit 268 which is adapted to latch the signal value of a clock counter signal from a clock counter 267 counting the clock pulse output by a clock generator 11. The latched value of the clock counter signal is representative of the input timing of the sensor pulse which activates the pulse pre-scaler 262 to produce the sample command. The latching circuit 268 sends the input timing indicative signal having a value corresponding to the latched clock counter signal value, to a memory controller 274. The memory controller 274 is responsive to a memory command input from an interrupt processing circuit 272 which in turn is responsive to the flag counter signal to issue a memory command which activates the memory controller 274 to transfer the input timing indicative signal from the latching circuit 268 to a memory area 276. The memory 276 sends the stored input timing indicadtive signal to a sample controller 270 whenever the input timing signal value corresponding to the latched value of the latching circuit 268 is written therein. The sample controller 270 performs operations substantially corresponding to that performed in the blocks 2008, 2010, 2012, 2032 and 2034 in FIG. 15, i.e. it determines number of sensor pulse in each group to be ignored. The sample controller 270 outputs a pulse number indicative signal to the pulse pre-scaler 262, which pulse number indicative signal has a value approximating the predetermined value to be compared with the counter value in the pulse pre-scaler 262.

The memory 276 also feeds the stored input timing indicative signal to a wheel acceleration and deceleration calculation circuit 278 and a pulse interval calculation circuit 280. The wheel acceleration and deceleration calculation circuit 278 first calculates a pulse interval difference between pairs of three successively sampled sensor pulses. The obtained pulse interval difference is compared with a reference value so as to distinguish if the pulse interval difference is great enough to allow calculation of the wheel acceleration and deceleration $a_w$. If the obtained pulse interval difference is greater than the reference value, than the wheel acceleration and deceleration calculation ciruit 278 performs calculation of the wheel acceleration and deceleration according to the foregoing formula (1). If the obtained pulse interval difference is smaller than the reference value, the wheel acceleration and deceleration calculation circuit 278 shifts the operational mode thereof in a manner substantially corresponding to the procedure disclosed with reference to FIG. 16, so as to achieve a pulse interval difference large enough to permit the wheel acceleration and deceleration calculation. On the other hand, the pulse interval calculation circuit 280 performs calculations to obtain the pulse interval between the current pulse and the immediate preceding pulse and sends a pulse interval indicative signal to a memory 282. The memory 282 sends a stored pulse interval indicative signal to a wheel speed calculation circuit 284 which is associated with a 10 ms timer 292. The 10 ms timer 292 produces a timer signal every 10 ms to activate the wheel speed calculation circuit 284. The wheel speed calculation circuit 284 is responsive to the timer signal to perform calculation of the wheel speed $V_w$ by calculating the reciprocal value of the pulse interval indicative signal from the memory 282. The wheel speed calculation circuit 284 thus produces a wheel speed indicative signal to be fed to a target wheel speed calculation circuit 288 and to a slip rate calculation circuit 290 which is also associated with the 10 ms timer to be activated by the timer signal every 10 ms.

The target wheel speed calculation circuit 288 is adapted to detect the wheel speed $V_w$ at which the wheel acceleration and deceleration $a_w$ calculated by the wheel acceleration and deceleration calculating circuit 278 exceeds than a predetermined deceleration rate $-b$. The target wheel speed calculation circuit 288 measures the interval between time at which the wheel deceleration exceeds the predetermined deceleration value. Based on the wheel speed at the foregoing times and the measured period of time, the target wheel speed calculation circuit 288 derives a decelerating ratio of the wheel speed to produce a target wheel speed indicative signal. The target wheel indicative signal of the target wheel speed calculation circuit 288 and the wheel speed indicative signal from the wheel speed calculation circuit 284 are fed to a slip rate calculation circuit 290.

The slip rate calculation circuit 290 is also responsive to the timer signal from the 10 ms timer 292 to perform calculation of the slip rate R based on the wheel speed indicative signal from the wheel speed calculation circuit 284 and the target wheel speed calculation circuit 288, and accordance with the formula (2).

The slip rate calculation circuit 290 and the wheel acceleration and deceleration calculation circuit 278 are connected to an output unit 294 to feed the acceleration and deceleration indicative signal and the slip rate control signal thereto. The output unit 294 determines the operation mode of the actuator 16 based on the wheel acceleration and deceleration indicative signal value and the slip rate indicative signal value according to the table of FIG. 26. The output unit 294 thus produces the inlet and outlet signals EV and AV with a combination of signal levels corresponding to the selected operation mode of the actuator.

On the other hand, the wheel speed calculation circuit 284 is also connected to the flag counter 266 to feed a decrementing signal whenever the calculation of the wheel speed is completed and so decrement the counter value of the flag counter by 1. The flag counter 266 is also connected to a comparator 295 which is adapted to compare the counter value of the flag counter with a reference value, e.g. 2. When the counter value of the flag counter 266 is greater than or equal to the reference value, the comparator 295 outputs a comparator signal to an overflow detector 296. The overflow detector 296 is responsive to the comparator signal to feed a sample mode shifting command to be fed to the pulse pre-scaler 262 to shift the sample mode to increase the number of the sensor pulses in each sample group.

ON the other hand, the clock counter 267 is connected to an overflow flag generator 297 which detects when the counter value reaches the full count of the clock counter to produce an overflow flag signal. The overflow flag signal of the overflow flag generator 297 is fed to an overflow flag counter 298 which is adapted to count the overflow flag signals and send an overflow counter value indicative signal to a judgment circuit 299. The judgment circuit 299 compares the overflow counter indicative signal value with a reference value e.g. 2. The judgment circuit 299 produces a reset signal when the overflow counter indicative signal value is equal to or greater than the reference value. The reset signal resets the wheel acceleration and deceleration calculation circuit 278 and the wheel speed calculation circuit 284 to zero. On the other hand, the overflow flag counter is connected to the wheel speed calculation circuit 284 and is responsive to the decrementing signal output from the wheel speed calculation circuit as set forth above to be reset in response to the decrementing signal.

As set forth above, according to the present invention, an anti-skid brake control system can sample the input timing of sensor pulses without error. In addition, as will be appreciated, the invention constructed as hereabove, fulfills all of the objects and advantages sought therefor.

What is claimed is:

1. An anti-skid brake control system for an automotive brake system comprising:
    a hydraulic brake circuit including a wheel cylinder for applying braking force to a vehicle wheel, said hydraulic circuit further including a pressure control valve for increasing fluid pressure in said wheel cylinder in a first position thereof, for decreasing the fluid pressure in the wheel cylinder in a second position thereof and for holding fluid pressure at constant value in a third position thereof;
    a wheel speed sensor for producing sensor signal pulses having a pulse interval variable depending upon wheel rotation speed;
    first means for deriving wheel speed based on said sensor signal pulses;
    a second means for deriving wheel acceleration, said second means measuring duration of occurrence of a predetermined number of said sensor signal pulses and deriving said wheel acceleration based on successively obtained durations;
    third means for deriving a control signal based on the derived wheel speed and the derived wheel acceleration to operate said pressure control valve at one of said first and second positions; and
    fourth means for enabling said second means and third means at independent timing relative to each other, said fourth means enabling said second means at a given first, variable timing and said third means at a second, fixed timiing within each successive cycle of anti-skid control, said second timing being independent of said first timing and said fourth means increasing said predetermined number when a difference between pulse intervals is smaller than a predetermined value by a given value, and detecting occurrence of said predetermined number of said sensor signal pulses to enable said second means at said first timing.

2. The anti-skid brake control system as set forth in claim 1, which further comprises:
    a timer means for producing timer signals; and
    a fifth means for sampling and storing values of said timer signals in response to said sensor signal pulses.

3. The anti-skid brake control system as set forth in claim 2, wherein said first means derives wheel speed from the intervals between said sensor signal pulses, and said second means derives wheel acceleration from difference between successive intervals between said sensor signal pulses.

4. The anti-skid brake control system as set forth in claim 3, which further comprises a sixth means, for interrupting operation of one of said first, second and third means while said fifth means is sampling said timer signal values.

5. The anti-skid brake control system as set forth in claim 4, wherein said fifth means varies said number of sensor signal pulses forming said groups in a stepwise manner until the duration of each group of sensor signal pulses becomes greater than a given value.

6. The anti-skid brake control system as set forth in claim 5, wherein said fourth means periodically derives the difference between the lengths of time of successive groups of sensor signal pulses and derives said second timing on the basis of the derived difference.

7. An anti-skid brake control system for an automotive vehicle comprising:
    a hydraulic brake circuit including wheel cylinders, each associated with at least one corresponding vehicle wheel for applying braking force to the corresponding wheels;
    a pressure control valve associated with each of said wheel cylinders for controlling the fluid pressure applied to the corresponding wheel cylinder, said pressure control valve being operative to increase the fluid pressure in said wheel cylinder in a first position thereof, to decrease the fluid pressure in said wheel cylinder in a second position thereof and to hold the fluid pressure in said wheel cylinder at a constant value in a third position thereof;
    a wheel speed sensor for outputting sensor signal pulses separated by intervals, said intervals corresponding to instantaneous wheel rotation speed;
    a timer means for outputting timer signals;
    a controller operative in a first sampling operation for receiving said sensor signal pulses and timer signals and sampling values of the timer signals in response to each group of a given number of sensor signal pulses and in a second control operation for performing arithmetic operations for deriving values of the instantaneous wheel rotation speed and the acceleration of said corresponding wheel based on the successively sampled timer signal values and for deriving a control signal for controlling said pressure control valve in a predetermined sequence of said first, second and third positions for optimizing braking characteristics, said controller deriving said given number such that the difference between the lengths of time of successive groups of sensor signal pulses is larger than a predetermined value, said controller performing arithmetic operations for deriving said control signal during successive cycles of said anti-skid control at a constant first timing within each cycle and for deriving wheel acceleration at a second timing determined by completion of two successive groups of the given number of sensor signal pulses for which the difference between the lengths of time of the groups exceeds said predetermined value.

8. The anti-skid brake control system as set forth in claim 7, wherein said controller derives a wheel speed value on the basis of the difference between successively sampled timer signal values, said difference representative of the length of time between two groups of the given number of sensor signal pulses, a wheel acceleration value from the difference between the lengths of time of successive groups of sensor signals pulses, a target wheel speed value based on the derived wheel speed value at which a predetermined wheel acceleration value is detected, and a slip rate based on the wheel speed value and the target wheel speed value.

9. The anti-skid brake control system as set forth in claim 8, wherein said controller also derives the control signal for said pressure control valve corresponding to one of the first, second, and third positions on the basis of said wheel acceleration value and said slip rate value.

10. The anti-skid brake control system as set forth in claim 9, wherein said controller derives said given number such that the difference between the lengths of time of two successive groups of sensor signal pulses exceeds a predetermined value.

11. The anti-skid brake control system as set forth in claim 10, wherein said controller selectively performs said first and second operations and is responsive to sensor signal pulses to interrupt said second operation and perform said first operation.

12. The anti-skid brake control system as set forth in claim 11, wherein said controller counts the occurrences of interruption of said second operation in an interruption counter and decreases the value of said interruption counter each time said second operation is completed.

13. The anti-skid brake control system as set forth in claim 12, wherein during said first operation, said controller determines which of a plurality of processes are to be performed in said second operation with respect to each sampled timer signal value and identifies each process to indicate the processes to be performed.

14. The anti-skid brake control system as set forth in claim 13, wherein said plurality of processes include:
- a first process for storing the sampled timer signal values;
- a second process for storing the sampled timer signal values and calculating a time interval equal to the difference between the last two sampled timer signal values; and
- a third operation for storing the sampled timer signal value, calculating said time interval, and calculating wheel acceleration from the difference between the last two calculated time intervals.

15. The anti-skid brake control system as set forth in claim 14, wherein said controller identifies each sampled timer signal value sequentially.

16. The anti-skid control system as set forth in claim 15, wherein said controller re-initiates said sequential identifying after said first, second and third processes have all been performed.

17. The anti-skid control system as set forth in claim 16, wherein said controller is operative in said second control operation for actuating said pressure control valve to said first position whenever the derived slip rate and wheel acceleration satisfy a predetermined first condition, to said second position whenever the derived slip rate and wheel acceleration satisfy a predetermined second condition, and to said third position whenever the derived slip rate and wheel acceleration satisfy a predetermined third condition.

18. An anti-skid brake control system for an automotive vehicle comprising:
- a hydraulic brake system including a plurality of brake circuits associated with one or more wheel cylinders for applying braking force to corresponding vehicle wheels, and one or more pressure control valves associated with said wheel cylinders for controlling fluid pressure in the corresponding wheel cylinders so as to control the rotation speed of the wheels relative to vehicle speed at a predetermined optimum value, each of said pressure control valves being operative to increase fluid pressure in the corresponding wheel cylinder in a first position thereof, to decrease fluid pressure in a second position thereof and to hold the fluid pressure at constant value in a third position thereof;
- a plurality of sensors, each associated with corresponding vehicle wheels, each of said sensors producing wheel speed-indicative digital signals;
- a controller including a plurality of microprocessors, each of which is associated with the corresponding brake circuit to control positioning of said corresponding pressure control valves, each of said microprocessors operating independently of each other to record the input timing of said digital signals, to derive brake control variables including wheel speed and wheel acceleration on the basis of the recorded input timing values, to derive said wheel speed at every input timing of said digital signals based on the interval between successively input digital signals to derive a duration of occurrences of a predetermined number of said digital signals, to calculate a difference between successively obtained durations of occurrences of said predetermined number of said digital signals, to compare said difference with a predetermined value, to increase said predetermined number when said difference is smaller than a predetermined value by a given value, to detect occurrence of said predetermined number of said sensor signal pulses to enable the derivation of said wheel acceleration said wheel acceleration being derived based on successively obtained durations, and to derive a control signal for actuating the corresponding pressure control valve to one of said first, second and third positions to adjust the wheel speed toward a predetermined optimal relationship to the vehicle speed at a given fixed timing within each cycle of anti-skid control independent of the timing of derivation of acceleration.

19. An anti-skid brake control system for a front-engine, rear-wheel-drive automotive vehicle comprising:
- a hydraulic brake system including wheel cylinders, one cylinder associated with each of the front and rear vehicle wheels, first and second pressure control valves, each valve associated with one of the wheel cylinders associated with said front wheels, and a third pressure control valve associated with the wheel cylinders associated with said rear wheels, each of said first, second and third pressure control valves being operative to increase the fluid pressure in the corresponding wheel cylinders in a first position, to decrease the fluid pressure in said wheel cylinder in a second position and to hold the fluid pressure in said wheel cylinder constant in a third position;
- a first wheel speed sensor producing first sensor signal pulses having pulse intervals variable depending upon the rotation speed of one of the front wheels;
- a second wheel spaced sensor producing second sensor pulses having pulse intervals variable depending upon the rotation speed of the other front wheel;
- a third wheel speed sensor producing third sensor signal pulses having pulse intervals variable depending upon the average rotation speed of the rear wheels;
- a first controller associated with said first pressure control valve for controlling the position of the latter, said first controller being responsive to said first sensor signal pulses and including means to generate and record the input timing of said first sensor signal pulses, to derive brake control variables including wheel speed and wheel acceleration on the basis of recorded input timing values for anti-skid brake control of said one of the front wheels, to derive said wheel speed at every input timing of said first sensor signal pulses based on the interval between successive first sensor signal pulses to derive a duration of occurrences of a predetermined number of said first sensor signal pulses, to calculate a difference between successively obtained durations of occurrences of said predetermined number of said first sensor signal pulses, to compare said difference with a predetermined value to increase said predetermined number when said difference is smaller than a predetermined value by a given value, to detect occurrence of said predetermined number of said first sensor signal pulses to derive said wheel acceleration based on successively obtained durations, and to produce a first control signal which actuates said first pressure control valve to one of said first, second and third positions so as to adjust the rotation speed of said one of the front wheels toward a predetermined relationship to the vehicle speed at a given fixed timing within each successive cycle of anti-skid control independent of the timing of derivation of acceleration;

a second controller associated with said second pressure control valve for controlling the position of the latter, said second controller being responsive to said second sensor signal pulses and including means to generate and record the input timing of said second sensor signal pulses, to derive brake control variables including wheel speed and wheel acceleration on the basis of recorded input timing values for anti-skid brake control of said other front wheel, to derive said wheel speed at every input timing of said second sensor signal pulses based on the interval between successively second sensor signal pulses to derive a duration of occurrences of a predetermined number of said second sensor signal pulses, to calculate a differnce between successively obtained durations of occurrences of said predetermined number of said second sensor pulses, to compare said difference with a predetermined value to increase said predetermined number when said difference is smaller than a predetermined value by a given value, to detect occurrence of said predetermined number of said second sensor signal pulses to derive said wheel acceleration based on successively obtained durations, and to produce a first control signal which actuates said first pressure control valve to one of said first, second and third positions so as to adjust the rotation speed of said one of the front wheels toward a predetermined relationship to the vehicle speed at a given predetermined timing within each successive cycle of anti-skid control independent of the timing of derivation of acceleration; and a third controller associated with said third pressure control valve for controlling the position of the latter, said first controller being responsive to said third sensor signal pulses and including means to generate and record the input timing of said third sensor signal pulses, to derive brake control variables including wheel speed and wheel acceleration on the basis of recorded input timing values for anti-skid brake control of said rear wheels, to derive said wheel speed at every input timing of said third sensor signal pulses based on the interval between successively third sensor signal pulses to derive a duration of occurrences of a predetermined number of said third sensor signal pulses, to calculate a difference between successively obtained durations of occurrences of said predetermined number of said third sensor pulses, to compare said difference with a predetermined value to increase asaid predetermined number when said difference is smaller than a predetermined value by a signal value, to detect occurrence of said predetermined number of said third sensor signal pulses to derive said wheel acceleration based on successively obtained durations, and to produce a third control signal which actuates said third pressure control valve to one of said first, second and third positions so as to adjust the rotational speed of said rear wheels toward a predetermined relationship to the vehicle speed at a given, set timing within each successive cycle of anti-skid control independent of the timing of the derivation of acceleration.

20. The anti-skid brake control system as set forth in claim 19, wherein said first, second and third controllers operate independently of each other.

21. A method for anti-skid controlling an automotive hydraulic brake system including a wheel cylinder for applying hydraulic braking force to a wheel, and a pressure control valve for controlling the fluid pressure in said wheel cylinder so as to increase the pressure in a first position, to decrease the pressure in a second position and to hold the pressure constant in a third position, which method comprises the steps of:

producing sensor signal pulses separated by intervals, said intervals representative of wheel speed;

producing a timer signal;

sampling said timer signal in response to a given number of said sensor signal pulses and storing a value of said timer signal;

adjusting said given number to determine a sample mode in which the difference between the time durations of successive groups of the given number of sensor signal pulses is greater than a predetermined value;

performing arithmetic operations on the stored timer signal value of said sensor pulse groups in order to derive a control signal for controlling the rotation speed of the wheel relative to vehicle speed at a predetermined optimum value at a given, fixed first timing within each successive cycle of anti-skid control and to derive wheel acceleration at a variable second timing which is independent of said first timing; said second timing being determined by completion of the sampling of two successive groups of the given number of sensor signal pulses for which the difference between the time durations of the groups exceeds said predetermined value; and controlling said pressure control valve positions according to said control signal.

22. The method as set forth in claim 21, which further comprises a step of interrupting said arithmetic operations in response to said given number of sensor signal pulses in order to sample and store the timer signal value.

23. The method as set forth in claim 22, wherein said arithmetic operations for deriving wheel speed are performed at a predetermined constant frequency.

24. The method as set forth in claim 23, wherein the arithmetic operations for deriving wheel acceleration are performed after sampling the three timer signal values.

* * * * *